US009900768B2

(12) United States Patent
Zheng et al.

(10) Patent No.: US 9,900,768 B2
(45) Date of Patent: Feb. 20, 2018

(54) METHOD AND DEVICE FOR SYNCHRONIZING UPLINK CIPHERING PARAMETER IN UNACKNOWLEDGED MODE

(71) Applicant: HUAWEI TECHNOLOGIES CO., LTD., Shenzhen (CN)

(72) Inventors: Xiaoxiao Zheng, Shanghai (CN); Yinghong Yang, Shanghai (CN); Li Feng, Shanghai (CN); Xiaoying Xu, Shanghai (CN); Zhufen Fu, Shanghai (CN); Lunfeng Yu, Shenzhen (CN); Yafei Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 437 days.

(21) Appl. No.: 13/908,276

(22) Filed: Jun. 3, 2013

(65) Prior Publication Data

US 2013/0266143 A1 Oct. 10, 2013

Related U.S. Application Data

(63) Continuation of application No. PCT/CN2011/083488, filed on Dec. 5, 2011.

(30) Foreign Application Priority Data

Dec. 3, 2010 (CN) .......................... 2010 1 0590695

(51) Int. Cl.
*H04L 29/06* (2006.01)
*H04W 12/00* (2009.01)
(Continued)

(52) U.S. Cl.
CPC ......... *H04W 12/00* (2013.01); *H04L 63/0428* (2013.01); *H04W 12/02* (2013.01); *H04W 80/02* (2013.01)

(58) Field of Classification Search
CPC .. H04L 63/0428; H04W 12/02; H04W 12/00; H04W 80/02
(Continued)

(56) References Cited

U.S. PATENT DOCUMENTS 7,852,803 B2 * 12/2010 Kim ............................. 370/328
8,964,985 B2 * 2/2015 Alexander ............ H04W 12/02
380/255

(Continued)

FOREIGN PATENT DOCUMENTS

CN 101053184 10/2007
CN 101075865 11/2007
(Continued)

OTHER PUBLICATIONS

Chinese Office Action issued Jan. 10, 2014, in corresponding Chinese Patent Application No. 201010590695.5.
(Continued)

*Primary Examiner* — John B King
*Assistant Examiner* — Narciso Victoria
(74) *Attorney, Agent, or Firm* — Staas & Halsey LLP

(57) ABSTRACT

Embodiments of the present invention provide a method and a device for synchronizing an uplink ciphering parameter in unacknowledged mode. The method for synchronizing an uplink ciphering parameter in unacknowledged mode includes: sending an indication message to a terminal when detecting that an unrecoverable error occurs in an uplink packet or that the uplink packet is invalid, where the indication message is used to instruct the terminal to initialize an uplink ciphering parameter; receiving a response message sent by the terminal; and initializing the uplink ciphering parameter according to an initial value of the ciphering parameter. The embodiments of the present invention solve a service defect, namely, a break of the commu- (Continued)

nication link caused by synchronization of an uplink ciphering parameter between the terminal and the radio network controller in unacknowledged mode, and shorten the time of synchronizing the uplink ciphering parameter without interrupting the service.

44 Claims, 12 Drawing Sheets

(51) Int. Cl.
*H04W 12/02* (2009.01)
*H04W 80/02* (2009.01)

(58) Field of Classification Search
USPC .......................................................... 380/274
See application file for complete search history.

(56) References Cited

U.S. PATENT DOCUMENTS

| | | | |
|---|---|---|---|
| 2008/0064390 A1* | 3/2008 | Kim | H04W 60/00 455/425 |
| 2008/0101609 A1* | 5/2008 | Jiang | H04L 63/123 380/274 |
| 2009/0304184 A1* | 12/2009 | Miyagawa | 380/274 |
| 2010/0197230 A1* | 8/2010 | Charles et al. | 455/63.1 |
| 2010/0278341 A1* | 11/2010 | Kubota | H04W 12/02 380/257 |
| 2010/0332933 A1* | 12/2010 | Kubota | 714/746 |
| 2012/0195185 A1* | 8/2012 | Kumar et al. | 370/216 |

FOREIGN PATENT DOCUMENTS

| | | |
|---|---|---|
| CN | 101150866 A | 3/2008 |
| CN | 101174943 | 5/2008 |
| EP | 2056636 | 5/2009 |
| EP | 2234424 | 9/2010 |

OTHER PUBLICATIONS

*The Data Link Layer*, XP-002707599 (pp. 200, 201, and 527-530).
$3^{rd}$ *Generation Partnership Project; Technical Specification Group Radio Access Network; Radio Resource Control (RRC); Protocol specification* (Release 10), 3GPP TS 25.331 V10.0.0, Jun. 2010, pp. 1-1806.
$3^{rd}$ *Generation Partnership Project; Technical Specification Group Radio Access Network; Radio Resource Control (RRC); Protocol specification* (Release 10), 3GPP TS 25.331 V10.1.0, Sep. 2010, pp. 1-1792.
International Search Report, dated Mar. 15, 2012, in corresponding International Application No. PCT/CN2011/083488 (2 pp.).
Written Opinion of the International Searching Authority, dated Mar. 15, 2012, in corresponding International Application No. PCT/CN2011/083488 (12 pp.).
Extended European Search Report, dated Aug. 12, 2013, in corresponding European Application No. 11845522.9 (8 pp.).
International Search Report, dated Mar. 15, 2012, in corresponding International Application No. PCT/CN2011/083488 (4 pp.).

* cited by examiner

METHOD AND DEVICE FOR SYNCHRONIZING UPLINK CIPHERING PARAMETER IN UNACKNOWLEDGED MODE

CROSS-REFERENCE TO RELATED APPLICATIONS

This application is a continuation of International Application No. PCT/CN2011/083488, filed on Dec. 5, 2011, which claims priority to Chinese Patent Application No. 201010590695.5, filed on Dec. 3, 2010, both of which are hereby incorporated by reference in their entireties.

TECHNICAL FIELD

Embodiments of the present invention relate to communication technologies, and in particular, to a method and a device for synchronizing an uplink ciphering parameter in unacknowledged mode.

BACKGROUND

In a 3GPP system, after a terminal and a network establish secure communication through authentication successfully, a ciphering process is performed between the terminal and an RNC (radio network controller) on the network side. A ciphering mechanism between the terminal and the network side is used to protect data transmitted between the terminal and the network side against thefts or attacks. An input ciphering parameter includes a ciphering key (CK), a ciphering key sequence number (COUNT-C), a bearer identifier (BEARER ID), a transmission direction (DIRECTION), and a required key stream length (LENGTH). If a radio bearer uses a non-transparent RLC (Radio Link Control, radio link control) mode (acknowledged mode AM or unacknowledged mode UM), ciphering is performed at an RLC sublayer; if a radio bearer uses a transparent RLC mode (TM), ciphering is performed at a MAC sublayer (MAC-d entity).

Based on a ciphering key stream generated according to the preceding input parameter, a transmitter performs ciphering computation for a transmitted plain text, and generates a corresponding cipher text. After a receiver generates a deciphering key stream by using the same ciphering parameter and ciphering computation method, the receiver uses the deciphering key stream to decipher the cipher text. In a radio bearer of a non-transparent RLC mode, an uplink and a downlink each correspond to a ciphering key sequence number COUNT-C. The COUNT-C is made up of an RLC HFN (hyper frame number) and an RLC SN (sequence number). High 20 bits of the HFN are initialized with a start value, and the remaining bits are initialized with 0. The HFN increases by 1 after each RLC SN cycle. The terminal transfers the Start value to the RNC through signaling, and each terminal has a Start value list. If a ciphering parameter used by the terminal and the RNC are not synchronized, a data reception error is caused. At present, in UM RLC mode, the detection of UM RLC downlink data transmission errors is implemented by a PDCP layer of the terminal. After the PDCP layer detects a downlink data packet error, the terminal initiates a cell update process, and synchronization of the ciphering parameter may be implemented between the terminal and the RNC through the cell update process.

However, no corresponding detection and recovery mechanism is available for receiving UM RLC uplink data. If packets are lost continuously during the reception of UM RLC uplink data, the uplink ciphering parameter is not synchronized between the uplink transmitting UM RLC entity and the peer receiving UM RLC entity of the RNC. At present, the uplink ciphering parameter can only be synchronized through RRC reestablishment, but the RRC reestablishment causes service interruption and service recovery is slow.

SUMMARY

Embodiments of the present invention provide a method and a device for synchronizing an uplink ciphering parameter in unacknowledged mode, which solve the defect of service interruption caused by a break of the communication link between a terminal and a radio network controller when the uplink ciphering parameter is synchronized between the terminal and the radio network controller in unacknowledged mode in the prior art, and increase the speed of synchronizing the uplink ciphering parameter without interrupting the service.

In one aspect, an embodiment of the present invention provides a method for synchronizing an uplink ciphering parameter in unacknowledged mode, including: detecting whether an unrecoverable error occurs in an uplink packet sent by a terminal in unacknowledged mode or whether the uplink packet is invalid; when detecting that an unrecoverable error occurs in the uplink packet or that the uplink packet is invalid, sending an indication message to the terminal, where the indication message is used to instruct the terminal to initialize an uplink ciphering parameter; receiving a response message sent by the terminal; and initializing the uplink ciphering parameter according to an initial value of a ciphering parameter.

In one aspect, an embodiment of the present invention provides a method for synchronizing an uplink ciphering parameter in unacknowledged mode, including: receiving an indication message sent by a radio network controller, where the indication message is used to instruct the terminal to initialize an uplink ciphering parameter; initializing the uplink ciphering parameter according to the indication message and an initial value of the ciphering parameter; and sending a response message to the radio network controller.

In one aspect, an embodiment of the present invention provides a terminal, including: an indication message receiving module, configured to receive an indication message sent by a radio network controller, where the indication message is used to instruct the terminal to initialize an uplink ciphering parameter; a first initializing module, configured to initialize the uplink ciphering parameter according to the indication message and an initial value of the ciphering parameter; and a response sending module, configured to send a response message to the radio network controller.

In one aspect, an embodiment of the present invention provides a radio network controller, including: an error detecting module, configured to detect whether an unrecoverable error occurs in an uplink packet sent by a terminal in unacknowledged mode or whether the uplink packet is invalid; an indication message sending module, configured to send an indication message to the terminal when it is detected that an unrecoverable error occurs in the uplink packet or that the uplink packet is invalid, where the indication message is used to instruct the terminal to initialize an uplink ciphering parameter; a response receiving module, configured to receive a response message sent by the terminal; and a second initializing module, configured to initialize the uplink ciphering parameter according to an initial value of the ciphering parameter.

In the embodiment of the present invention, when the radio network controller detects that an unrecoverable error occurs in the uplink packet or that the uplink packet is invalid, the radio network controller sends the indication message to the terminal to instruct the terminal to initialize the ciphering parameter. After the radio network controller receives the response message of the terminal, which indicates that the terminal has initialized the uplink ciphering parameter, the radio network controller initializes a local uplink ciphering parameter, thereby achieving synchronization of an uplink ciphering parameter between the terminal and the RNC. In the embodiment of the present invention, during synchronization of an uplink ciphering parameter, the communication link between the terminal and the radio network controller is not broken. Therefore, the service between the terminal and the radio network controller is not interrupted, and the time of synchronizing the uplink ciphering parameter is shortened.

In another aspect, an embodiment of the present invention further provides another method for synchronizing an uplink ciphering parameter in unacknowledged mode, including: detecting the number of uplink packets sent consecutively and unsuccessfully in unacknowledged mode to a radio network controller; generating an initial value of a ciphering parameter when detecting that the number of uplink packets sent consecutively and unsuccessfully reaches a preset threshold; sending a cell update request carrying the initial value of the ciphering parameter to the radio network controller; and initializing an uplink ciphering parameter according to the initial value of the ciphering parameter after receiving a cell update confirm message sent by the radio network controller.

In another aspect, an embodiment of the present invention further provides another terminal, including: a sending failure detecting module, configured to detect the number of uplink packets sent consecutively and unsuccessfully in unacknowledged mode to a radio network controller; a third initial value generating module, configured to generate an initial value of a ciphering parameter when it is detected that the number of uplink packets sent consecutively and unsuccessfully reaches a preset threshold; a cell update request sending module, configured to send a cell update request carrying the initial value of the ciphering parameter to the radio network controller; a cell update confirm receiving module, configured to receive a cell update confirm message sent by the radio network controller; and a third initializing module, configured to initialize an uplink ciphering parameter according to the initial value of the ciphering parameter after the cell update confirm message sent by the radio network controller is received.

In another aspect, an embodiment of the present invention provides another radio network controller, including: a cell update request receiving module, configured to receive a cell update request which is sent by a terminal and carries an initial value of a ciphering parameter, where the cell update request is used to instruct the radio network controller to initialize an uplink ciphering parameter according to the initial value of the ciphering parameter; a fourth initializing module, configured to initialize the uplink ciphering parameter according to the initial value of the ciphering parameter in the cell update request; and a cell update confirm sending module, configured to send a cell update confirm message to the terminal.

In the embodiment of the present invention, the terminal detects failure of uplink packet sending, and the terminal initiates a cell update process when the terminal detects that uplink packet sending fails. Synchronization of an uplink ciphering parameter between the RNC and the terminal is implemented in the cell update process. In the embodiment of the present invention, during synchronization of an uplink ciphering parameter, the communication link between the terminal and the radio network controller is not broken. Therefore, the service between the terminal and the radio network controller is not interrupted, and the speed of synchronizing the uplink ciphering parameter is increased.

BRIEF DESCRIPTION OF DRAWINGS

To illustrate the technical solutions in the embodiments of the present invention more clearly, the following briefly describes the accompanying drawings required for describing the embodiments. Apparently, the accompanying drawings in the following description illustrate some embodiments of the present invention, and persons of ordinary skill in the art can derive other drawings from these accompanying drawings without creative efforts.

DESCRIPTION OF EMBODIMENTS

To make the objectives, technical solutions, and advantages of the present invention more comprehensible, the following clearly describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

The technical solutions in the embodiments of the present invention may be not only applied to a scenario of desynchronization of an uplink ciphering parameter of a circuit switched (Circuit Switched, CS) voice service and a VoIP (Voice over Internet Protocol) service, but also applied to an application scenario of desynchronization of an uplink ciphering parameter of other services carried in UM mode.

Figure 1A:
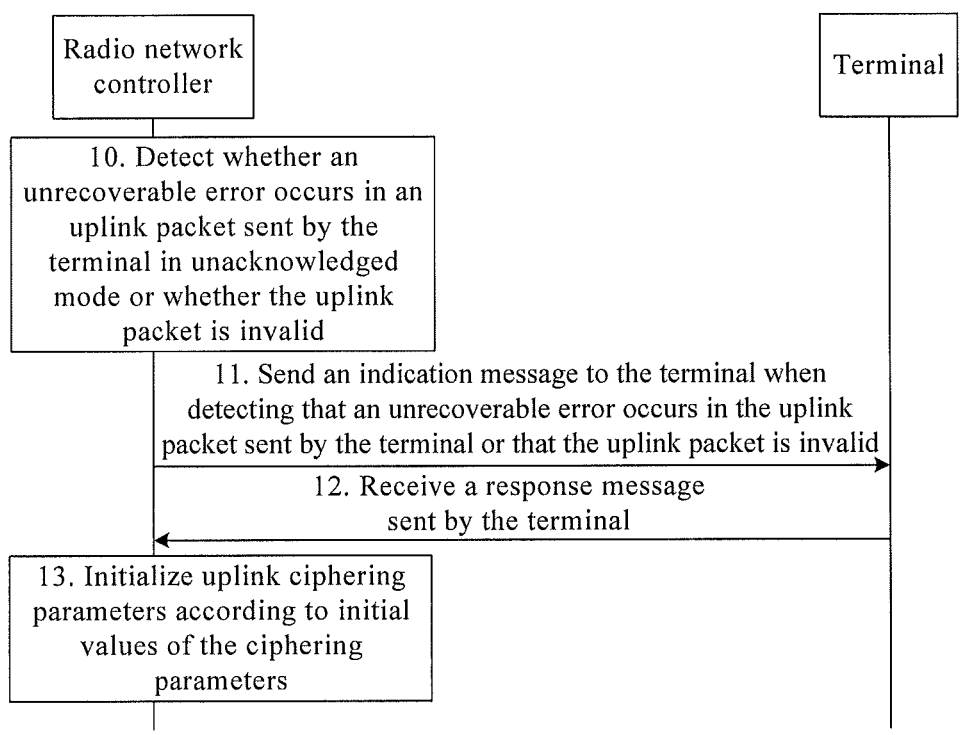
FIG. 1A is a flowchart of a method for synchronizing an uplink ciphering parameter in unacknowledged mode according to an embodiment 1 of the present invention.

FIG. 1A is a flowchart of Embodiment 1 of a method for synchronizing an uplink ciphering parameter in unacknowledged mode according to the present invention. As shown in FIG. 1A, this embodiment includes:

Step 10: A radio network controller detects whether an unrecoverable error occurs in an uplink packet sent by a terminal in unacknowledged mode or whether the uplink packet is invalid.

An unrecoverable error occurs in the uplink packet or the uplink packet is invalid, which includes a deciphering error of the uplink packet caused by desynchronization of an uplink ciphering parameter. If an unrecoverable error occurs in the uplink packet or the uplink packet is invalid due to desynchronization of an uplink ciphering parameter, the embodiment of the present invention may be used to implement synchronization of an uplink ciphering parameter and further solve the problem of the error or invalidity of the uplink packet.

There are many types of uplink packets sent by the terminal to the RNC, for example, uplink packets of a CS voice service and uplink packets of a VoIP service, and different services are carried on different RBs. The RNC may agree with the terminal that the uplink packet of a specific service is detected, so as to maintain synchronization of an uplink ciphering parameter of the RB bearing the service. For example, the RNC agrees with the terminal that the uplink packet of the CS voice service is detected. In addition, the RNC may autonomously determine to detect the uplink packet of which service (in the embodiment of the present invention, the detected service determined by the RNC is called a designated service), for example, the RNC determines to detect the uplink packet of the VoIP service.

Step 11: The radio network controller sends an indication message to the terminal when detecting that an unrecoverable error occurs in the uplink packet sent by the terminal in unacknowledged mode or that the uplink packet is invalid.

The indication message is used to instruct the terminal to initialize an uplink ciphering parameter. The RNC sends an indication message to the terminal when detecting that an unrecoverable error occurs in the uplink packet of an agreed service or that the uplink packet is invalid, to instruct the terminal to initialize an uplink ciphering parameter bore by the RB bearing the agreed service, where the indication message does not need to carry an RB identifier. After the terminal receives the indication message not carrying an RB identifier, the terminal initializes an uplink ciphering parameter of the RB bearing the agreed service.

In addition, when the RNC determines a designated service to be detected, and the RNC detects that an unrecoverable error occurs in the uplink packet of the designated service or that the uplink packet is invalid, the RNC sends an indication message that carries the identifier of an RB bearing the designated service to the terminal, to instruct the terminal to initialize an uplink ciphering parameter of the RB. For example, the RNC determines to detect the uplink packet of the VoIP service, and the indication message sent to the terminal includes an RB identifier corresponding to the RB bearing the VoIP service; after the terminal receives the indication message carrying the RB identifier, the terminal initializes, according to the RB identifier, an uplink ciphering parameter of the RB corresponding to the RB identifier.

Step 12: The radio network controller receives a response message sent by the terminal.

After the terminal receives the indication message for initializing an uplink ciphering parameter which is sent by the radio network controller, the terminal initializes, according to an initial value of the ciphering parameter, an uplink ciphering parameter corresponding to the agreed RB or the RB designated by the RNC, for example, initializes the uplink ciphering key sequence number COUNT-C corresponding to the agreed RB or the RB designated by the RNC. Afterward, a response message is returned to the radio network controller.

Step 13: The radio network controller initializes an uplink ciphering parameter according to the initial value of the ciphering parameter.

After receiving the response message returned by the terminal, the radio network controller executes the same initialization operation as the terminal, and initializes, according to the initial value of the ciphering parameter, a local uplink ciphering parameter corresponding to the agreed RB or the RB designated in the indication message, so as to implement synchronization of the uplink ciphering parameter with the terminal.

The an initial value of the ciphering parameter in the embodiment of the present invention may be an initial value of a ciphering parameter generated and sent by the terminal to the radio network controller in the ciphering negotiation phase; or may be an initial value of a ciphering parameter generated after recomputation by the terminal under the instruction of the RNC; or may be an initial value of a ciphering parameter generated when the radio network controller detects that an unrecoverable error occurs in the uplink packet.

When the RNC instructs the terminal to generate a ciphering parameter, the RNC sends an initial value generation indication message to the terminal, to instruct the terminal to generate an initial value of the ciphering parameter and initialize the uplink ciphering parameter according to the initial value of the ciphering parameter. The terminal generates an initial value of the ciphering parameter after receiving the initial value generation indication message. After initializing the uplink ciphering parameter, the terminal sends a response message carrying the initial value of the ciphering parameter to the RNC. The RNC initializes the local uplink ciphering parameter according to the initial value of the ciphering parameter in the response message.

In the case that the RNC generates an initial value of the ciphering parameter, the RNC sends an initialization indication message including the initial value of the ciphering parameter to the terminal. The terminal returns a response message to the RNC after receiving the initialization indication message and initializing the local uplink ciphering parameter according to the initial value of the ciphering parameter in the message. The RNC initializes the local uplink ciphering parameter according to the generated initial value of the ciphering parameter after receiving the response message.

In the embodiment of the present invention, when the radio network controller detects that an unrecoverable error occurs in the uplink packet or that the uplink packet is invalid, the radio network controller sends the indication message to the terminal to instruct the terminal to initialize the ciphering parameter. After the radio network controller receives the response message of the terminal, which indicates that the terminal has initialized the uplink ciphering parameter, the radio network controller initializes the local uplink ciphering parameter, thereby achieving synchronization of an uplink ciphering parameter between the terminal and the RNC. In the embodiment of the present invention, during synchronization of an uplink ciphering parameter, the communication link between the terminal and the radio network controller is not broken. Therefore, the service between the terminal and the radio network controller is not interrupted, and the time of synchronizing the uplink ciphering parameter is shortened.

Figure 1B:
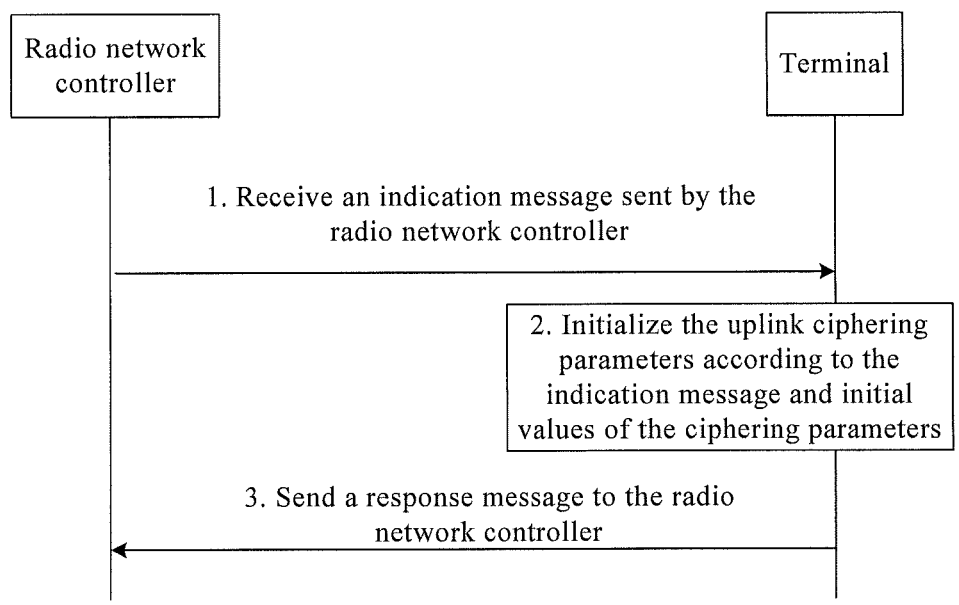
FIG. 1B is a flowchart of the method for synchronizing uplink ciphering parameter in unacknowledged mode on a terminal according an embodiment 1 of to the present invention.

FIG. 1B is a flowchart of Embodiment 1 of the method for synchronizing an uplink ciphering parameter in unacknowledged mode on a terminal according to the present invention. This embodiment mainly describes the technical solution of the method for synchronizing an uplink ciphering parameter according to the present invention from the perspective of a terminal. As shown in FIG. 1B, this embodiment includes:

Step 1: Receive an indication message sent by a radio network controller.

The indication message is used to instruct the terminal to initialize an uplink ciphering parameter.

Step 2: Initialize the uplink ciphering parameter according to the indication message and an initial value of the ciphering parameter.

After the terminal receives the indication message for initializing an uplink ciphering parameter which is sent by the radio network controller, the terminal initializes, according to an initial value of the ciphering parameter, an uplink ciphering parameter corresponding to an agreed RB or an RB designated by the RNC, for example, initializes the uplink ciphering key sequence number COUNT-C corresponding to the agreed RB or the RB designated by the RNC.

The an initial value of the ciphering parameter may be an initial value of a ciphering parameter generated and sent by the terminal to the radio network controller in the ciphering negotiation phase; or may be an initial value of a ciphering parameter generated after recomputation by the terminal under the instruction of the RNC; or may be an initial value of a ciphering parameter generated when the radio network controller detects that an unrecoverable error occurs in the uplink packet.

Step 3: Send a response message to the radio network controller.

In the embodiment of the present invention, the terminal initializes the uplink ciphering parameter after receiving the indication message sent by the RNC, and returns the response message to the RNC. After the radio network controller receives the response message of the terminal, which indicates that the terminal has initialized the uplink ciphering parameter, the radio network controller initializes a local uplink ciphering parameter, thereby achieving synchronization of an uplink ciphering parameter between the terminal and the RNC.

Figure 2:
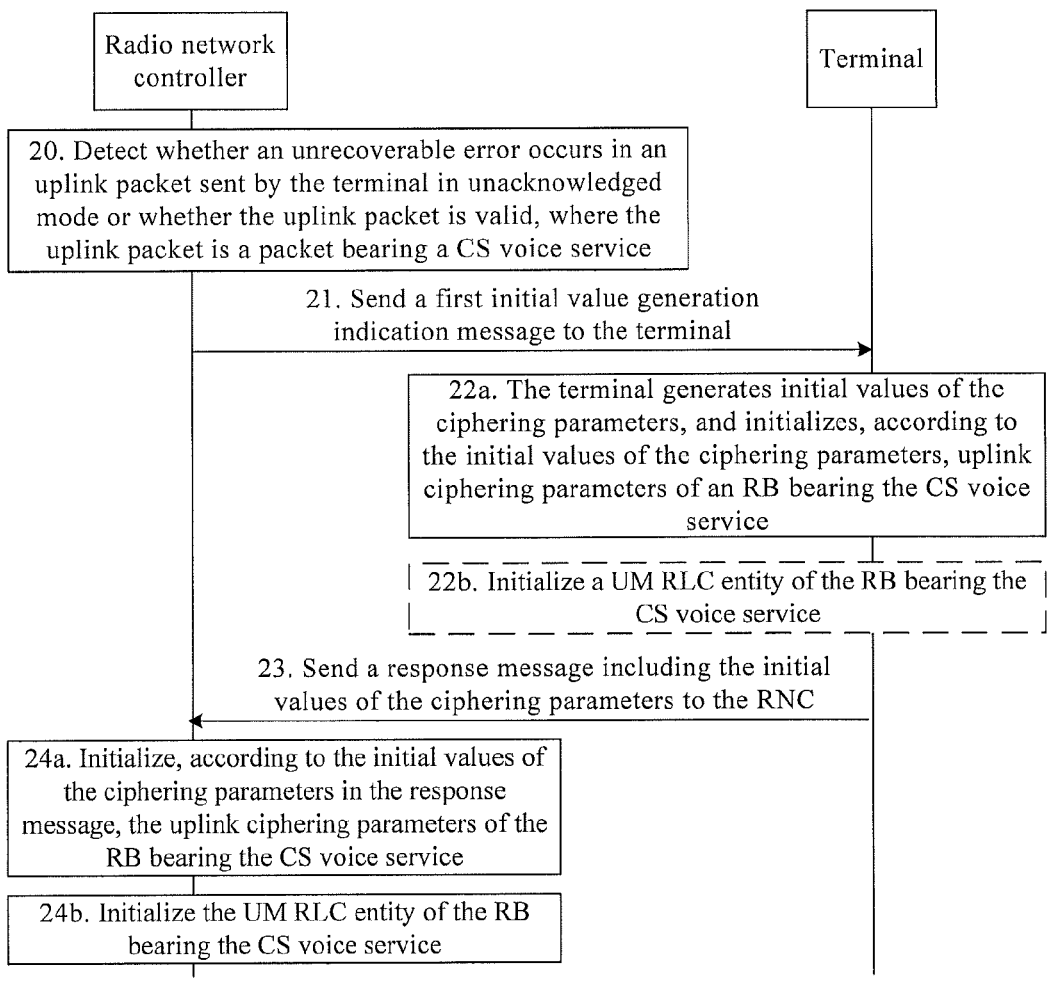
FIG. 2 is a flowchart of a method for synchronizing an uplink ciphering parameter in unacknowledged mode according to an embodiment 2 of the present invention.

FIG. 2 is a flowchart of Embodiment 2 of the method for synchronizing an uplink ciphering parameter in unacknowledged mode according to the present invention. In a second embodiment, the RNC agrees with the terminal that the sending of an uplink packet of a CS voice service is detected. In addition, the initial value of the ciphering parameter used for initializing an uplink ciphering parameter is generated by the terminal instructed by the RNC, and are sent to the RNC through a response message of the terminal. As shown in FIG. 2, this embodiment includes:

Step 20: An RNC detects whether an unrecoverable error occurs in an uplink packet sent by a terminal in unacknowledged mode or whether the uplink packet is valid, where the uplink packet is a packet bearing a CS voice service.

The RNC detects, according to the agreement with the terminal, the sending in unacknowledged mode of the uplink packet bearing the CS voice service.

Step 21: When the RNC detects that an unrecoverable error occurs in the uplink packet bearing the CS voice service or that the uplink packet is invalid, the RNC sends a first initial value generation indication message to the terminal.

The first initial value generation indication message instructs the terminal to generate an initial value of a ciphering parameter and initialize, according to the initial value of the ciphering parameter, the uplink ciphering parameter of the RB bearing the CS voice service. Optionally, the RNC may further instruct, in the first initial value generation indication message sent to the terminal, the terminal to further initialize the UM RLC entity corresponding to the RB bearing the CS service, thereby initializing other parameters related to uplink packet sending.

In addition, when the RNC determines to detect the uplink packet of the designated service according to a specific condition, when the RNC detects that an error occurs in the uplink packet of the designated service or that the uplink packet is invalid, the RNC sends a second initial value generation indication message carrying the RB identifier corresponding to the RB bearing the designated service to the terminal. For example, the RNC determines to detect the uplink packet of the VoIP service, and when detecting that an error occurs in a packet of the VoIP service or that the packet is invalid, the RNC sends the second initial value generation indication message carrying the RB identifier corresponding to the RB bearing the VoIP service to the terminal. The second initial value generation indication message instructs the terminal to generate an initial value of the ciphering parameter and initialize, according to the RB identifier carried in the second initial value generation indication message, the uplink ciphering parameter of the RB corresponding to the RB identifier. Optionally, the RNC may further instruct, in the second initial value generation indication message sent to the terminal, the terminal to further initialize the UM RLC entity of the RB corresponding to the RB identifier.

Step 22a: The terminal generates an initial value of the ciphering parameter, and initializes, according to the initial value of the ciphering parameter, an uplink ciphering parameter of the RB bearing the CS voice service.

Step 23: The terminal sends a response message including the initial value of the ciphering parameter to the RNC.

After receiving the first initial value generation indication message sent by the RNC, the terminal first generates an initial value of a ciphering parameter and then initializes, according to the initial value of the ciphering parameter, the uplink ciphering parameter of the RB bearing the CS voice service. Afterward, the terminal sends a response message including the initial value of the ciphering parameter to the RNC. For example, the uplink ciphering parameter is an uplink ciphering key sequence number COUNT-C (including an HFN and an SN); after the terminal generates a start value, the terminal uses the start value to initialize the HFN, and optionally initializes the SN to 0. Afterward, the terminal sends the response message carrying the start value to the RNC. Optionally, if the first initial value generation indication message further instructs the terminal to further initialize the UM RLC entity, as shown in FIG. 2, after step 22a, step 22b is further included: Initialize the UM RLC entity of the RB bearing the CS voice service.

In addition, if the terminal receives the second initial value generation indication message which is sent by the RNC and carries the RB identifier, the terminal initializes, according to the RB identifier carried in the second initial value generation indication message, an uplink ciphering parameter of the RB corresponding to the RB identifier. Optionally, if the second initial value generation indication message further instructs the terminal to further initialize the RLC entity, the terminal further initializes the UM RLC entity of the RB corresponding to the RB identifier after initializing, according to the RB identifier carried in the second initial value generation indication message, an uplink ciphering parameter of the RB corresponding to the RB identifier.

Step 24a: The RNC initializes, according to the initial value of the ciphering parameter in the response message, the uplink ciphering parameter of the RB bearing the CS voice service.

The RNC performs the same initialization operation as the terminal after receiving the response message returned by the terminal. Specifically, the RNC initializes the local uplink ciphering parameter according to the initial value of the ciphering parameter carried in the response message after receiving the response message. For example, the RNC initializes the HFN in the ciphering key sequence number COUNT-C according to the start value in the response message, and then optionally initializes the SN in the COUNT-C to 0. Optionally, if the first initial value generation indication message further instructs the terminal to further initialize the RLC entity, as shown in FIG. 2, after step 24a, step 24b is further included: Initialize the RLC entity of the RB bearing the CS voice service.

In addition, if the RNC does not agree with the terminal on the service to be detected, the RNC sends a second initial value generation indication message to the terminal; in this case, the RNC initializes, according to the RB identifier, the uplink ciphering parameter of the RB corresponding to the RB identifier. Optionally, if the second initial value generation indication message further instructs the terminal to further initialize the RLC entity, the RNC may further initialize the UM RLC entity of the RB after initializing the uplink ciphering parameter of the RB corresponding to the RB identifier.

In the embodiment of the present invention, the RNC agrees with the terminal that the uplink packet of the CS voice service is detected. When the RNC detects that an unrecoverable error occurs in the uplink packet of the CS voice service or that the uplink packet is invalid, the RNC sends a first initial value generation indication message without an RB identifier to the terminal. The terminal first generates an initial value of a ciphering parameter according to the first initial value generation indication message, and then initializes, according to the generated initial value of the ciphering parameter and the agreement with the RNC, a local uplink ciphering parameter bore by the RB bearing the CS voice. Afterward, the terminal sends a response message carrying the generated initial value of a ciphering parameter to the RNC; the RNC initializes, according to the initial value of the ciphering parameter in the response message, the local uplink ciphering parameter bore by the RB bearing the CS voice service, so that synchronization of an uplink ciphering parameter between the terminal and the RNC is implemented for the CS voice service, which may fast recover the CS voice service. Further, the terminal and the RNC may initialize the RLC entity after initializing the uplink ciphering parameter. In addition, if the RNC carries an RB identifier in the indication message, the terminal and the RNC initialize an uplink ciphering parameter of the RB corresponding to the RB identifier sequentially, and optionally may initialize the UM RLC entity of the RB.

Figure 3:
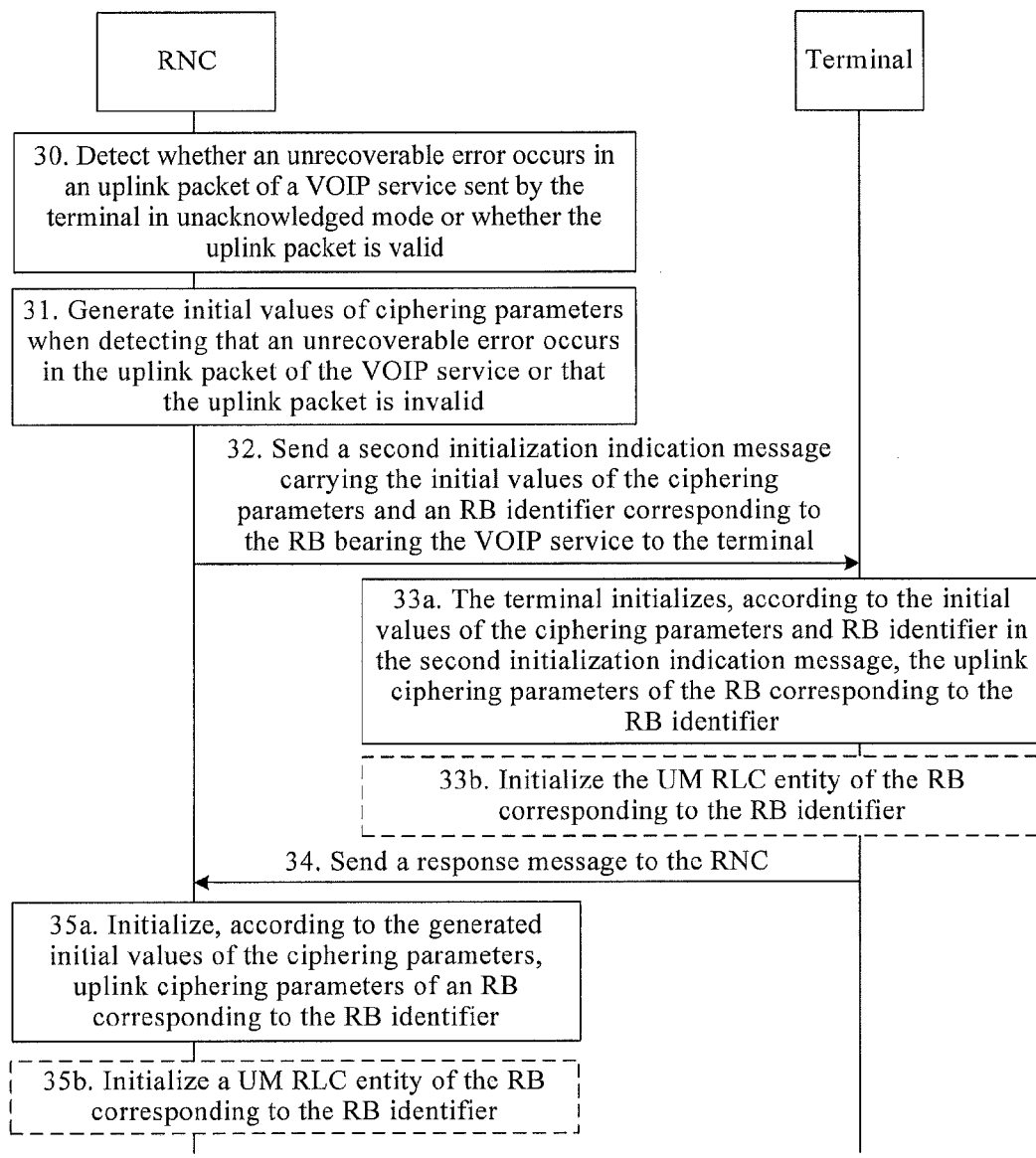
FIG. 3 is a flowchart of a method for synchronizing an uplink ciphering parameter in unacknowledged mode according an embodiment 3 of to the present invention.

FIG. 3 is a flowchart of Embodiment 3 of the method for synchronizing an uplink ciphering parameter in unacknowledged mode according to the present invention. In a third embodiment, the initial value of the ciphering parameter is generated by the RNC and is sent to the terminal through an initialization indication message. The terminal returns a response message to the RNC after initializing, according to the initial value of the ciphering parameter in the initialization indication message, a local uplink ciphering parameter. The RNC determines that the designated service to be detected is a VoIP service. The RNC sends the initialization indication message carrying the RB identifier corresponding to the RB bearing the VoIP service to the terminal. As shown in FIG. 3, this embodiment includes:

Step 30: An RNC detects whether an unrecoverable error occurs in an uplink packet of a VoIP service sent by a terminal in unacknowledged mode or whether the uplink packet is invalid.

Step 31: The RNC generates an initial value of a ciphering parameter when detecting that an unrecoverable error occurs in the uplink packet of the VoIP service or that the uplink packet is invalid.

Step 32: The RNC sends a second initialization indication message carrying the initial value of the ciphering parameter and an RB identifier corresponding to the RB bearing the VoIP service to the terminal.

When detecting that an unrecoverable error occurs in the uplink packet of the VoIP service, the RNC first generates an initial value of a ciphering parameter, and then sends a second initialization indication message carrying the generated initial value of the ciphering parameter and the RB identifier corresponding to the RB bearing the VoIP service to the terminal. The second initialization indication message instructs the terminal to initialize, according to the carried RB identifier and an initial value of the ciphering parameter, an uplink ciphering parameter of the RB corresponding to the RB identifier. Optionally, if the second initialization indication message instructs the terminal to further initialize the UM RLC entity of the RB corresponding to the RB identifier, and the RNC agrees with the terminal that the sending of the uplink packet bearing the agreed service is detected, in step 32, the RNC sends a first initialization indication message carrying the initial value of the ciphering parameter to the terminal. The first initialization indication message is used to instruct the terminal to initialize, according to the initial value of the ciphering parameter carried in the first initialization indication message, an uplink ciphering parameter of the radio bearer bearing the agreed service. Optionally, the first initialization indication message may further instruct the terminal to further initialize the UM RLC entity bearing the agreed service.

Step 33*a*: The terminal initializes, according to the initial value of the ciphering parameter and RB identifier in the second initialization indication message, the uplink ciphering parameter of the RB corresponding to the RB identifier.

Optionally, if the second initialization indication message instructs the terminal to further initialize the UM RLC entity of the RB corresponding to the RB identifier, after step 33*a*, step 33*b* is further included: Initialize the UM RLC entity of the RB corresponding to the RB identifier.

If the RNC sends a first initialization indication message to the terminal in step 32, the terminal initializes, according to the initial value of the ciphering parameter carried in the first initialization indication message, an uplink ciphering parameter bore by the RB bearing the agreed service. Optionally, if the RNC sends a first initialization indication message to the terminal in step 32, after the terminal initializes, according to the initial value of the ciphering parameter carried in the first initialization indication message, uplink ciphering parameter bore by the RB bearing the agreed service, the terminal further initializes the UM RLC entity of the RB corresponding to the RB identifier.

Step 34: The terminal sends a response message to the RNC.

Step 35*a*: The RNC initializes, according to the generated initial value of the ciphering parameter, an uplink ciphering parameter of the RB corresponding to the RB identifier.

The RNC performs the same initialization operation as the terminal after receiving the response message returned by the terminal. Specifically, after the RNC receives the response message of the terminal, the RNC initializes, according to the initial value of the ciphering parameter generated in step 31, an uplink ciphering parameter of the RB corresponding to the RB identifier carried in step 32. Optionally, if the second initialization indication message instructs the terminal to further initialize the UM RLC entity of the RB corresponding to the RB identifier, after step 35*a*, step 35*b* is further included: Initialize the UM RLC entity of the RB corresponding to the RB identifier.

If the RNC sends a first initialization indication message to the terminal in step 32, in step 35*a*, the RNC initializes an uplink ciphering parameter bore by the RB bearing an agreed service. Optionally, if the RNC sends a first initialization indication message to the terminal in step 32, after initializing an uplink ciphering parameter bore by the RB bearing the agreed service, the RNC further initializes the UM RLC entity corresponding to the RB bearing the agreed service.

In this embodiment, the RNC generates an initial value of a ciphering parameter and delivers the initial value of the ciphering parameter to the terminal, so that the terminal initializes the uplink ciphering parameter according to the initial value of the ciphering parameter. The RNC initializes the local uplink ciphering parameter according to the generated initial value of the ciphering parameter after receiving the returned response message. Therefore, without breaking the link, synchronization of an uplink ciphering parameter between the terminal and the RNC is implemented, and the service may be recovered fast. Further, the terminal may further initialize the RLC entity according to the indication of the RNC.

Figure 4A:
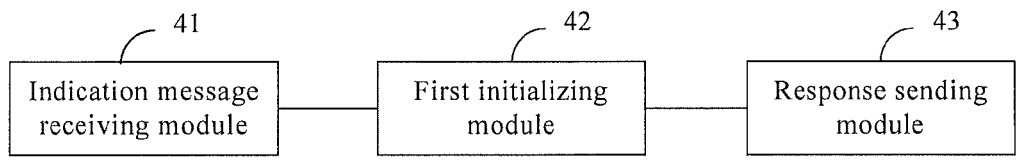
FIG. 4A is a schematic structural diagram of a terminal according to an embodiment 1 of the present invention.

FIG. 4A is a schematic structural diagram of Embodiment 1 of a terminal according to the present invention. As shown in FIG. 4A, this embodiment includes: an indication message receiving module 41, a first initializing module 42, and a response sending module 43.

The indication message receiving module 41 is configured to receive an indication message sent by a radio network controller, where the indication message is used to instruct the terminal to initialize an uplink ciphering parameter. The first initializing module 42 is configured to initialize the uplink ciphering parameter according to the indication message received by the indication message receiving module 41 and an initial value of the ciphering parameter. The response sending module 43 is configured to send a response message to the radio network controller after the first initializing module 42 initializes the uplink ciphering parameter.

The terminal in this embodiment may be a terminal in the method embodiment corresponding to FIG. 1, and for the operating principle of each of the above modules, reference may be made to the description in the method embodiment corresponding to FIG. 1, which is not described here again.

In the embodiment of the present invention, when the radio network controller detects that an unrecoverable error occurs in the uplink packet or that the uplink packet is invalid, the radio network controller sends the indication message to the terminal to instruct the terminal to initialize the uplink ciphering parameter. After the radio network controller receives the response message of the terminal, which indicates that the terminal has initialized the uplink ciphering parameter, the radio network controller initializes a local uplink ciphering parameter, thereby achieving synchronization of an uplink ciphering parameter between the terminal and the RNC. In the embodiment of the present invention, during synchronization of an uplink ciphering parameter, the communication link between the terminal and the radio network controller is not broken. Therefore, the service between the terminal and the radio network controller is not interrupted, and the time of synchronizing the uplink ciphering parameter is shortened.

Figure 4B:
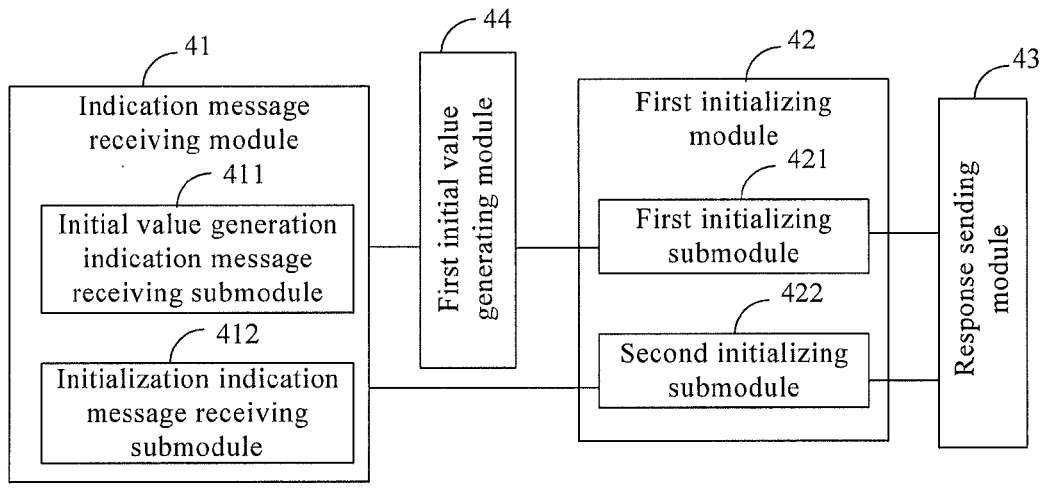
FIG. 4B is a schematic structural diagram of a terminal according to an embodiment 2 of the present invention.

FIG. 4B is a schematic structural diagram of Embodiment 2 of the terminal according to the present invention. As shown in FIG. 4B, on the basis of FIG. 4A, the terminal further includes: a first initial value generating module 44, configured to generate an initial value of a ciphering parameter.

The indication message receiving module 41 includes an initial value generation indication message receiving submodule 411 and an initialization indication message receiving submodule 412; and the first initializing module 42 includes a first initializing submodule 421 and a second initializing submodule 422.

The initial value generation indication message receiving submodule 411 is configured to receive an initial value generation indication message sent by the radio network controller, where the initial value generation indication message is used to instruct the terminal to generate the initial value of the ciphering parameter and instruct the terminal to initialize the uplink ciphering parameter according to the initial value of the ciphering parameter.

The first initializing submodule 421 is configured to initialize the uplink ciphering parameter according to the initial value generation indication message and the initial value of the ciphering parameter generated by the initial value generating module.

The response sending module 43 is further configured to send a response message including the initial value of the ciphering parameter generated by the initial value generating module to the radio network controller.

The initialization indication message receiving submodule 412 is configured to receive an initialization indication message sent by the radio network controller, where the initialization indication message is used to instruct the terminal to initialize the uplink ciphering parameter according to the initial value of the ciphering parameter carried in the initialization indication message.

The second initializing submodule 422 is configured to initialize the uplink ciphering parameter according to the initial value of the ciphering parameter carried in the initialization indication message.

The terminal in this embodiment may be a terminal in the method embodiments corresponding to FIG. 2 and FIG. 3, and for the operating principle of each of the above modules, reference may be made to the description in the embodiments corresponding to FIG. 2 and FIG. 3, which is not described here again.

In this embodiment, after receiving the indication message, the terminal may generate the initial value of the ciphering parameter and initialize the uplink ciphering parameter, and return the response message carrying the initial value of the ciphering parameter to the RNC. In addition, the terminal may initialize the uplink ciphering parameter according to the initial value of the ciphering parameter sent by the RNC.

Figure 4C:
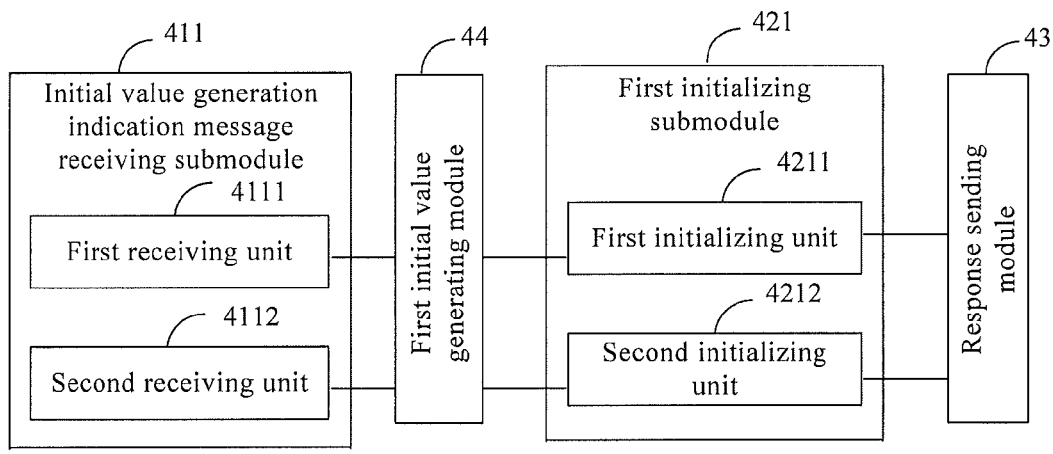
FIG. 4C is a schematic structural diagram of an initial value generation indication message receiving submodule and a first initializing submodule of the terminal according to an embodiment 2 of the present invention.

FIG. 4C is a schematic structural diagram of an initial value generation indication message receiving submodule and a first initializing submodule in Embodiment 2 of the terminal according to the present invention. As shown in FIG. 4C, the initial value generation indication message receiving submodule 411 includes: a first receiving unit 4111 and a second receiving unit 4112. The first initializing submodule 421 includes a first initializing unit 4211 and a second initializing unit 4212.

The first receiving unit 4111 is configured to receive a first initial value generation indication message sent by the radio network controller, where the first initial value generation indication message is used to instruct the terminal to generate the initial value of the ciphering parameter and initialize, according to the initial value of the ciphering parameter, an uplink ciphering parameter of a radio bearer bearing an agreed service.

The first initializing unit 4211 is configured to initialize, according to the first initial value generation indication message and the initial value of the ciphering parameter, the uplink ciphering parameter of the radio bearer bearing the agreed service.

The second receiving unit 4112 is configured to receive a second initial value generation indication message sent by the radio network controller, where the second initial value generation indication message is used to instruct the terminal to generate the initial value of the ciphering parameter and initialize, according to a radio bearer identifier carried in the second initial value generation indication message, an uplink ciphering parameter of a radio bearer corresponding to the radio bearer identifier, where the radio bearer corresponding to the radio bearer identifier is a radio bearer bearing the designated service.

The second initializing unit 4212 is configured to initialize, according to the initial value of the ciphering parameter and the radio bearer identifier carried in the second initial value generation indication message, the uplink ciphering parameter of the radio bearer corresponding to the radio bearer identifier.

The terminal in this embodiment may be a terminal in the method embodiments corresponding to FIG. 2 and FIG. 3, and for the operating principle of each of the above modules, reference may be made to the description in the method embodiments corresponding to FIG. 2 and FIG. 3, which is not described here again.

In this embodiment, after being generated by the terminal, the initial value of the ciphering parameter is provided to the RNC through the response message. The initial value generation indication message sent by the RNC may carry an RB identifier, or may not carry an RB identifier. After the terminal receives the initial value generation indication message not carrying an RB identifier, the terminal initializes, according to the agreement with the RNC, the uplink ciphering parameter bore by the RB bearing the agreed service, and may further initialize the UM RLC entity corresponding to the RB. After the terminal receives the initial value generation indication message carrying an RB identifier, the terminal initializes, according to the RB identifier, the uplink ciphering parameter of the RB corresponding to the RB identifier, and may further initialize the UM RLC entity corresponding to the RB.

Figure 4D:
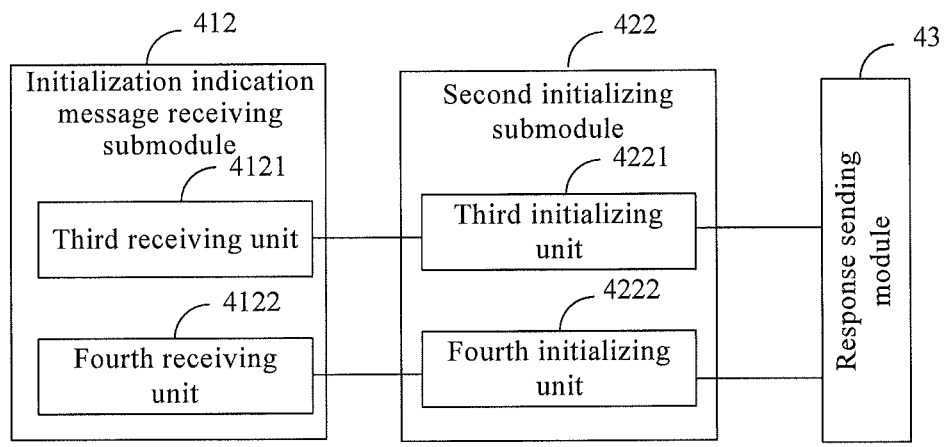
FIG. 4D is a schematic structural diagram of an initialization indication message receiving submodule and a second initializing submodule of the terminal according to an embodiment 2 of the present invention.

FIG. 4D is a schematic structural diagram of an initialization indication message receiving submodule and a second initializing submodule in Embodiment 2 of the terminal according to the present invention. As shown in FIG. 4D, an initialization indication message receiving submodule 412 includes a third receiving unit 4121 and a fourth receiving unit 4122; and a second initializing submodule 422 includes a third initializing unit 4221 and a fourth initializing unit 4222.

The third receiving unit 4121 is configured to receive a first initial value generation indication message sent by the radio network controller, where the first initial value generation indication message is used to instruct the terminal to initialize, according to the carried an initial value of the ciphering parameter, an uplink ciphering parameter of a radio bearer bearing an agreed service.

The third initializing unit 4221 is configured to initialize, according to the initial value of the ciphering parameter in the first initial value generation indication message, the uplink ciphering parameter of the radio bearer bearing the agreed service.

Further, the third initializing unit 4221 is further configured to initialize a radio link control entity of the radio bearer bearing the agreed service; and the first initialization indication message is further used to instruct the terminal to initialize the radio link control entity of the radio bearer bearing the agreed service.

The fourth receiving unit 4122 is configured to receive a second initialization indication message sent by the radio network controller, where the second initialization indication message is used to instruct the terminal to initialize, according to the initial value of the ciphering parameter and a radio bearer identifier carried in the second initialization indication message, an uplink ciphering parameter of a radio bearer corresponding to the radio bearer identifier, where the radio bearer corresponding to the radio bearer identifier is a radio bearer bearing the designated service.

The fourth initializing unit 4222 is configured to initialize, according to the initial value of the ciphering parameter in the second initial value generation indication message, the uplink ciphering parameter of the radio bearer corresponding to the radio bearer identifier.

Further, the fourth initializing unit 4222 is further configured to initialize a radio link control entity of the radio bearer corresponding to the radio bearer identifier; and the second initialization indication message is further used to instruct the terminal to initialize the radio link control entity of the radio bearer corresponding to the radio bearer identifier.

The terminal in this embodiment may be a terminal in the method embodiments corresponding to FIG. 2 and FIG. 3, and for the operating principle of each of the above modules, reference may be made to the description in the method embodiments corresponding to FIG. 2 and FIG. 3, which is not described here again.

In this embodiment, the initialization indication message sent by the RNC may carry an RB identifier, or may not carry an RB identifier. After the terminal receives the initialization indication message not carrying an RB identifier, the terminal initializes, according to the agreement with the RNC, the uplink ciphering parameter bore by the RB bearing the agreed service, and may further initialize the UM RLC entity corresponding to the RB. After the terminal receives the initialization indication message carrying an RB identifier, the terminal initializes, according to the RB identifier, the uplink ciphering parameter of the RB corresponding to the RB identifier, and may further initialize the UM RLC entity corresponding to the RB.

Figure 5A:
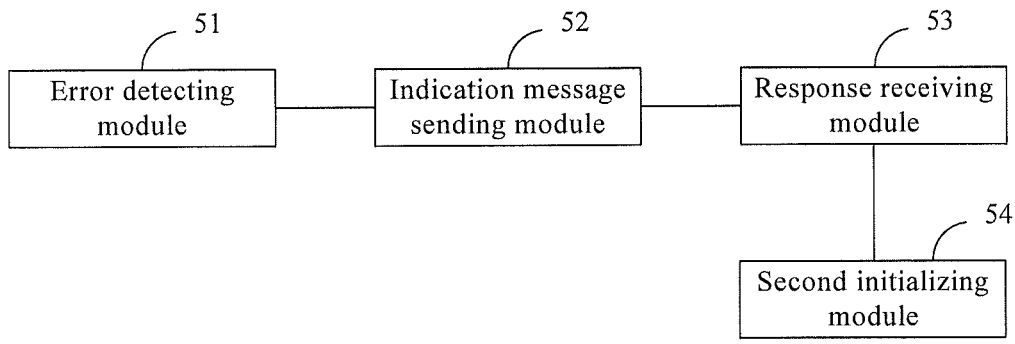
FIG. 5A is a schematic structural diagram of a radio network controller according to an embodiment 1 of the present invention.

FIG. 5A is a schematic structural diagram of Embodiment 1 of a radio network controller according to the present invention. As shown in FIG. 5A, this embodiment includes: an error detecting module 51, an indication message sending module 52, a response receiving module 53, and a second initializing module 54.

The error detecting module 51 is configured to detect whether an unrecoverable error occurs in an uplink packet sent by a terminal in unacknowledged mode or whether the uplink packet is invalid.

The indication message sending module 52 is configured to send an indication message to the terminal when it is detected that an unrecoverable error occurs in the uplink packet or that the uplink packet is invalid, where the indication message is used to instruct the terminal to initialize an uplink ciphering parameter.

The response receiving module 53 is configured to receive a response message sent by the terminal.

The second initializing module 54 is configured to initialize the uplink ciphering parameter according to an initial value of the ciphering parameter.

The radio network controller in this embodiment may be a radio network controller in the method embodiment corresponding to FIG. 1, and for the operating principle of each of the above modules, reference may be made to the description in the method embodiment corresponding to FIG. 1, which is not described here again.

In the embodiment of the present invention, when the radio network controller detects that an unrecoverable error occurs in the uplink packet or that the uplink packet is invalid, the radio network controller sends the indication message to the terminal to instruct the terminal to initialize the ciphering parameter. After the radio network controller receives the response message of the terminal, which indicates that the terminal has initialized the uplink ciphering parameter, the radio network controller initializes a local uplink ciphering parameter, thereby achieving synchronization of an uplink ciphering parameter between the terminal and the RNC. In the embodiment of the present invention, during synchronization of an uplink ciphering parameter, the communication link between the terminal and the radio network controller is not broken. Therefore, the service between the terminal and the radio network controller is not interrupted, and the time of synchronizing the uplink ciphering parameter is shortened.

Figure 5B:
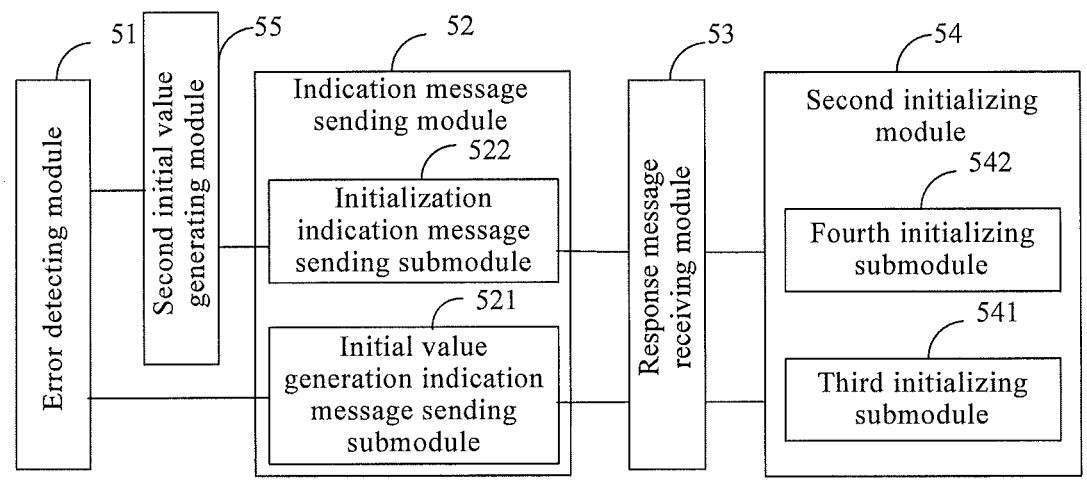
FIG. 5B is a schematic structural diagram of the radio network controller according to an embodiment 2 of the present invention.

FIG. 5B is a schematic structural diagram of Embodiment 2 of the radio network controller according to the present invention. As shown in FIG. 5B, this embodiment further includes: a second initial value generating module 55, configured to generate an initial value of a ciphering parameter. The indication message sending module 52 includes an initial value generation indication message sending submodule 521 and an initialization indication message sending submodule 522; and the second initializing module 54 includes a third initializing submodule 541 and a fourth initializing submodule 542.

The initial value generation indication message sending submodule 521 is configured to send an initial value generation indication message to the terminal when it is detected that an unrecoverable error occurs in the uplink packet or that the uplink packet is invalid, where the initial value generation indication message is used to instruct the terminal to generate the initial value of the ciphering parameter and instruct the terminal to initialize the uplink ciphering parameter according to the initial value of the ciphering parameter.

The response message receiving module 53 is further configured to receive a response message which is sent by the terminal and carries the initial value of the ciphering parameter.

The third initializing submodule 541 is configured to initialize the uplink ciphering parameter according to the initial value of the ciphering parameter in the response message.

The initialization indication message sending submodule 522 is configured to send an initialization indication message to the terminal when it is detected that an unrecoverable error occurs in the uplink packet or that the uplink packet is invalid, where the initialization indication message is used to instruct the terminal to initialize the uplink ciphering parameter according to the initial value of the ciphering parameter carried in the initialization indication message.

The fourth initializing submodule 542 is configured to initialize, after the response message sent by the terminal is received, the uplink ciphering parameter according to the generated initial value of the ciphering parameter.

The radio network controller in this embodiment may be a radio network controller in the method embodiments corresponding to FIG. 2 and FIG. 3, and for the operating principle of each of the above modules, reference may be made to the description in the method embodiments corresponding to FIG. 2 and FIG. 3, which is not described here again.

In this embodiment, the RNC may instruct the terminal to generate, after receiving the indication message, the initial value of the ciphering parameter and initialize the uplink ciphering parameter, and return the response message carrying the initial value of the ciphering parameter to the RNC. In addition, the RNC may instruct the terminal to initialize the uplink ciphering parameter according to the initial value of the ciphering parameter sent by the RNC.

Figure 5C:
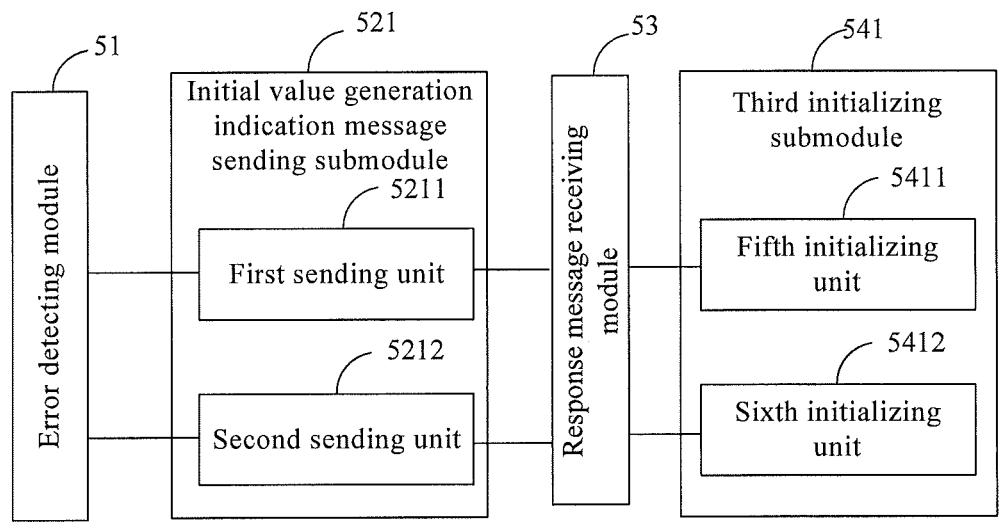
FIG. 5C is a schematic structural diagram of an initial value generation indication message sending submodule and a third initializing submodule of the radio network controller according to an embodiment 2 of the present invention.

FIG. 5C is a schematic structural diagram of an initial value generation indication message sending submodule and a third initializing submodule in Embodiment 2 of the radio network controller according to the present invention. As shown in FIG. 5C, an initial value generation indication message sending submodule 521 includes a first sending unit 5211 and a second sending unit 5212; and a third initializing submodule 541 includes a fifth initializing unit 5411 and a sixth initializing unit 5412.

The error detecting module 51 is specifically configured to detect whether an unrecoverable error occurs in an uplink packet sent by the terminal in unacknowledged mode or whether the uplink packet is invalid, where the uplink packet is a packet of a service agreed with the terminal.

The first sending unit 5211 is configured to send a first initial value generation indication message to the terminal, where the first initial value generation indication message is used to instruct the terminal to generate the initial value of the ciphering parameter and initialize, according to the initial value of the ciphering parameter, an uplink ciphering parameter of a radio bearer bearing the agreed service.

The fifth initializing unit 5411 is configured to initialize, according to the initial value of the ciphering parameter in the response message after the response message sent by the terminal is received, the uplink ciphering parameter of the radio bearer bearing the agreed service.

Further, the fifth initializing unit 5411 is further configured to initialize a UM RLC entity of the radio bearer bearing the agreed service. The first initial value generation indication message is further used to instruct the terminal to initialize the UM RLC entity of the radio bearer bearing the agreed service.

The error detecting module 51 is specifically configured to detect whether an unrecoverable error occurs in an uplink packet sent by the terminal in unacknowledged mode or whether the uplink packet is invalid, where the uplink packet is a packet of a designated service.

The second sending unit 5212 is configured to send a second initial value generation indication message to the terminal, where the second initial value generation indication message is used to instruct the terminal to generate the initial value of the ciphering parameter and initialize, according to a radio bearer identifier carried in the second initial value generation indication message, an uplink ciphering parameter of a radio bearer corresponding to the radio bearer identifier, where the radio bearer corresponding to the radio bearer identifier is a radio bearer bearing the designated service.

The sixth initializing unit 5412 is configured to initialize, according to the initial value of the ciphering parameter in the response message after the response message sent by the terminal is received, the uplink ciphering parameter of the radio bearer corresponding to the radio bearer identifier.

Further, the sixth initializing unit 5412 is further configured to initialize a UM RLC entity of the radio bearer bearing the agreed service. The second initial value generation indication message is further used to instruct the terminal to initialize the UM RLC entity of the radio bearer bearing the agreed service.

The radio network controller in this embodiment may be a radio network controller in the method embodiments corresponding to FIG. 2 and FIG. 3, and for the operating principle of each of the above modules, reference may be made to the description in the method embodiments corresponding to FIG. 2 and FIG. 3, which is not described here again.

In this embodiment, the RNC generates the initial value of the ciphering parameter, and sends the initial value of the ciphering parameter to the terminal through the initial value generation indication message. The initial value generation indication message sent by the RNC may carry an RB identifier, or may not carry an RB identifier. After the terminal receives the initial value generation indication message not carrying an RB identifier, the terminal initializes, according to the agreement with the RNC, the uplink ciphering parameter bore by the RB bearing the agreed service, and may further initialize the UM RLC entity corresponding to the RB. After the terminal receives the initial value generation indication message carrying an RB identifier, the terminal initializes, according to the RB identifier, the uplink ciphering parameter of the RB corresponding to the RB identifier, and may further initialize the UM RLC entity corresponding to the RB.

Figure 5D:
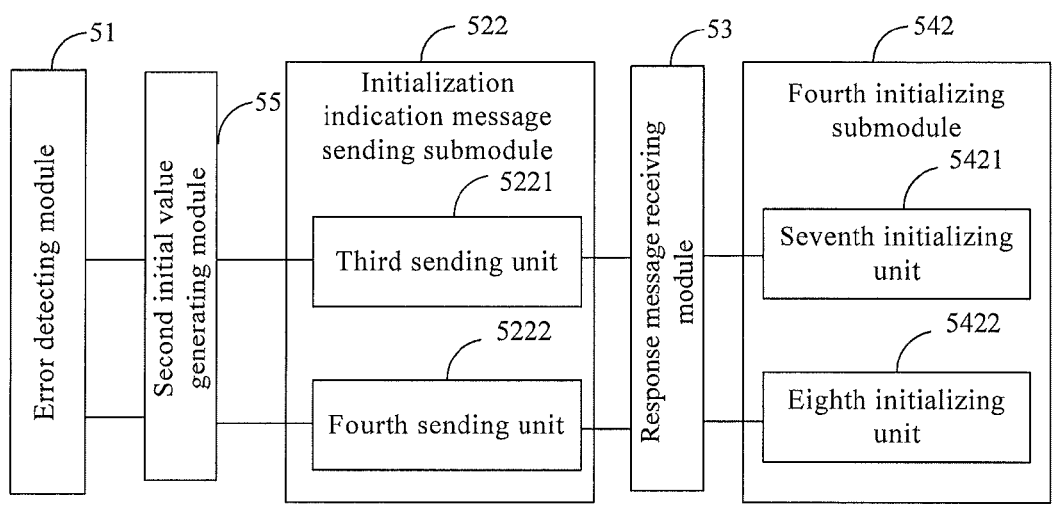
FIG. 5D is a schematic structural diagram of an initialization indication message sending submodule and a fourth initializing submodule of the radio network controller according to an embodiment 2 of the present invention.

FIG. 5D is a schematic structural diagram of an initialization indication message sending submodule and a fourth initializing submodule in Embodiment 2 of the radio network controller according to the present invention. As shown in FIG. 5D, an initialization indication message sending submodule 522 includes a third sending unit 5221 and a fourth sending unit 5222; and a fourth initializing submodule 542 includes a seventh initializing unit 5421 and an eighth initializing unit 5422.

The error detecting module 51 is specifically configured to detect whether an unrecoverable error occurs in an uplink packet sent by the terminal in unacknowledged mode or whether the uplink packet is invalid, where the uplink packet is a packet of a service agreed with the terminal.

The third sending unit 5221 is configured to send a first initialization indication message to the terminal, where the first initialization indication message is used to instruct the terminal to initialize, according to the initial value of the ciphering parameter carried in the first initialization indication message, an uplink ciphering parameter of a radio bearer bearing the agreed service.

The seventh initializing unit 5421 is configured to initialize, according to the initial value of the ciphering parameter generated by the second initial value generating module 55, the uplink ciphering parameter of the radio bearer bearing the agreed service.

The error detecting module 51 is specifically configured to detect whether an unrecoverable error occurs in an uplink packet sent by the terminal in unacknowledged mode or whether the uplink packet is invalid, where the uplink packet is a packet of a designated service.

The fourth sending unit 5222 is configured to send a second initialization indication message to the terminal, where the second initialization indication message is used to instruct the terminal to initialize, according to the initial value of the ciphering parameter carried in the second initialization indication message, an uplink ciphering parameter of a radio bearer corresponding to a radio bearer identifier, where the radio bearer corresponding to the radio bearer identifier is a radio bearer bearing the designated service.

The eighth initializing unit 5422 is configured to initialize, according to the generated initial value of the ciphering parameter, the uplink ciphering parameter of the radio bearer corresponding to the radio bearer identifier.

The radio network controller in this embodiment may be a radio network controller in the method embodiments corresponding to FIG. 2 and FIG. 3, and for the operating principle of each of the above modules, reference may be made to the description in the method embodiments corresponding to FIG. 2 and FIG. 3, which is not described here again.

In this embodiment, the RNC sends the generated initial value of the ciphering parameter in the initialization indication message to the terminal. The initialization indication message sent by the RNC may carry an RB identifier, or may not carry an RB identifier. After the terminal receives the initialization indication message not carrying an RB identifier, the terminal initializes, according to the agreement with the RNC, the uplink ciphering parameter bore by the RB bearing the agreed service, and may further initialize the UM RLC entity corresponding to the RB. After the terminal receives the initialization indication message carrying an RB identifier, the terminal initializes, according to the RB identifier, the uplink ciphering parameter of the RB corresponding to the RB identifier, and may further initialize the UM RLC entity corresponding to the RB.

In the above embodiments, the RNC detects the sending of the uplink packet, and instructs, when detecting that an unrecoverable error occurs in the uplink packet or that the uplink packet is invalid, the terminal to initialize the uplink ciphering parameter. The main difference between the following embodiments and the above embodiments lies in that: The terminal determines, by detecting whether uplink packet sending fails, whether an uplink ciphering parameter is desynchronized, and the terminal initiates a cell update process when detecting that uplink packet sending fails consecutively. Synchronization of an uplink ciphering parameter between the terminal and the RNC is implemented in the cell update process.

Figure 6:
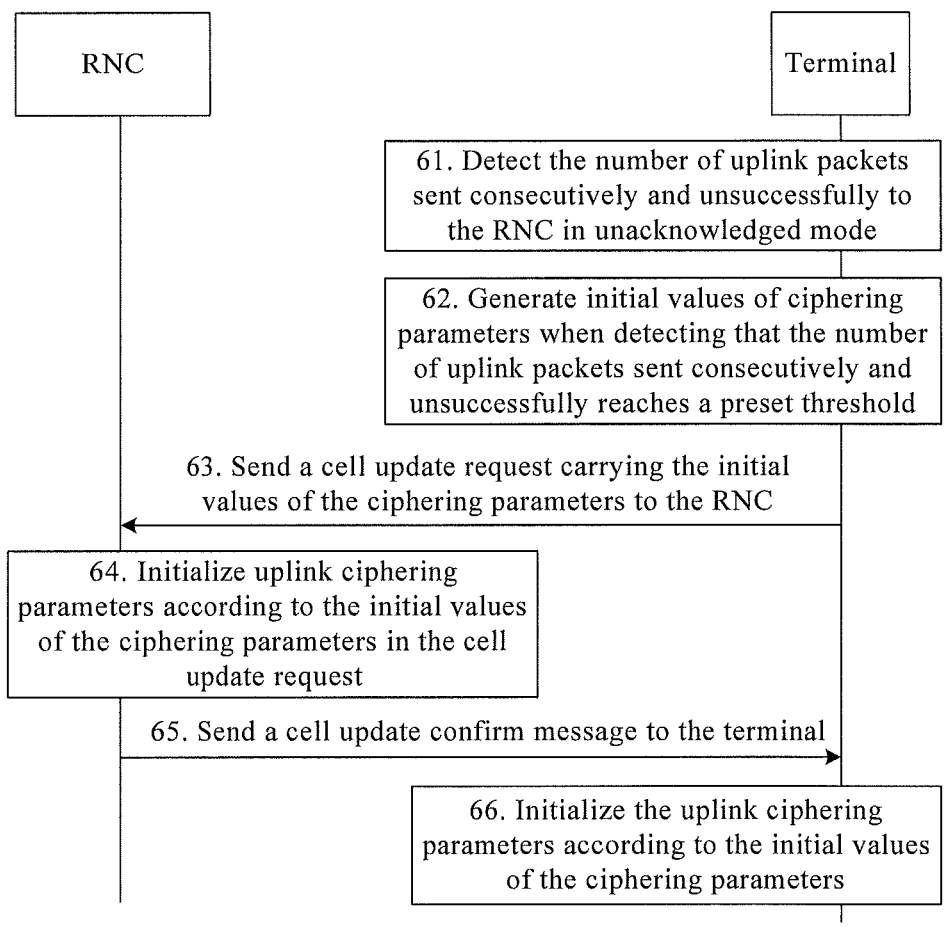
FIG. 6 is a flowchart of Embodiment 1 of another method for synchronizing an uplink ciphering parameter in unacknowledged mode according to a fourth embodiment of the present invention.

FIG. 6 is a flowchart of Embodiment 1 of another method for synchronizing an uplink ciphering parameter in unacknowledged mode according to a fourth embodiment of the present invention. The following mainly describes the technical solution of the method for synchronizing an uplink ciphering parameter in unacknowledged mode according to the present invention from the perspective of a terminal. As shown in FIG. 6, this embodiment includes:

Step 61: A terminal detects the number of uplink packets sent consecutively and unsuccessfully to an RNC in unacknowledged mode.

The terminal may detect the number of uplink packets sent consecutively and unsuccessfully, where the uplink packets are packets of a service agreed with the radio network controller, or may detect, according to a detection indication message sent by the RNC, an uplink packet of a service designated by the RNC. Therefore, when detecting the sending of the uplink packet, the terminal may actively start a HARQ entity of a MAC layer to detect the sending of the uplink packet, or may start, under the instruction of the RNC, the HARQ entity to detect the sending of the uplink packet. Therefore, before step 61, the following may be further included: The terminal receives the detection indication message sent by the RNC.

Step 62: The terminal generates an initial value of a ciphering parameter when detecting that the number of uplink packets sent consecutively and unsuccessfully reaches a preset threshold.

The preset threshold may be delivered by the RNC to the terminal or may be set by the terminal. When the terminal detects that the number of uplink packets sent consecutively and unsuccessfully reaches the preset threshold, it indicates that too many uplink packets are lost, which may cause desynchronization of an uplink ciphering parameter. Therefore, the terminal generates an initial value of a ciphering parameter, and implements initialization of an uplink ciphering parameter of the terminal and RNC through a cell update process.

Step 63: The terminal sends a cell update request carrying the initial value of the ciphering parameter to the RNC.

The terminal sends the cell update request to the RNC, so that an uplink ciphering parameter is initialized through the cell update process. Further, in the cell update request, the terminal may instruct the RNC to initialize a UM RLC entity.

If the terminal detects an uplink packet of a service agreed with the RNC, the terminal sends a first cell update request carrying the initial value of the ciphering parameter to the RNC. The first cell update request does not carry an RB identifier corresponding to an RB bearing the agreed service. After receiving the first cell update request, the RNC initializes an uplink ciphering parameter of the RB bearing the agreed service, and returns a cell update confirm message to the terminal.

If the terminal detects an uplink packet of a designated service determined by the RNC, the terminal sends a second cell update request carrying the initial value of the ciphering parameter to the RNC. Because the RNC needs to send a detection indication message to the terminal beforehand, to instruct the terminal to detect the uplink packet of the designated service, where the detection indication message carries an RB identifier corresponding to an RB bearing the designated service, the second update request does not need to carry an RB identifier, either. After the RNC receives the second cell update request, the RNC initializes an uplink ciphering parameter bore by the RB bearing the designated service, and returns a cell update confirm message to the terminal.

Step 64: The RNC initializes an uplink ciphering parameter according to the initial value of the ciphering parameter in the cell update request.

Step 65: The terminal receives the cell update confirm message sent by the RNC.

Step 66: The terminal initializes the uplink ciphering parameter according to the initial value of the ciphering parameter.

The terminal performs the same initialization operation as the RNC after receiving the cell update confirm message returned by the RNC.

In this embodiment, the terminal detects failure of uplink packet sending, and the terminal initiates a cell update process when the terminal detects that uplink packet sending fails. Synchronization of an uplink ciphering parameter between the RNC and the terminal is implemented in the cell update process. In the embodiment of the present invention, during synchronization of an uplink ciphering parameter, the communication link between the terminal and the radio network controller is not broken. Therefore, the service between the terminal and the radio network controller is not interrupted, and the speed of synchronizing the uplink ciphering parameter is increased.

Figure 7:
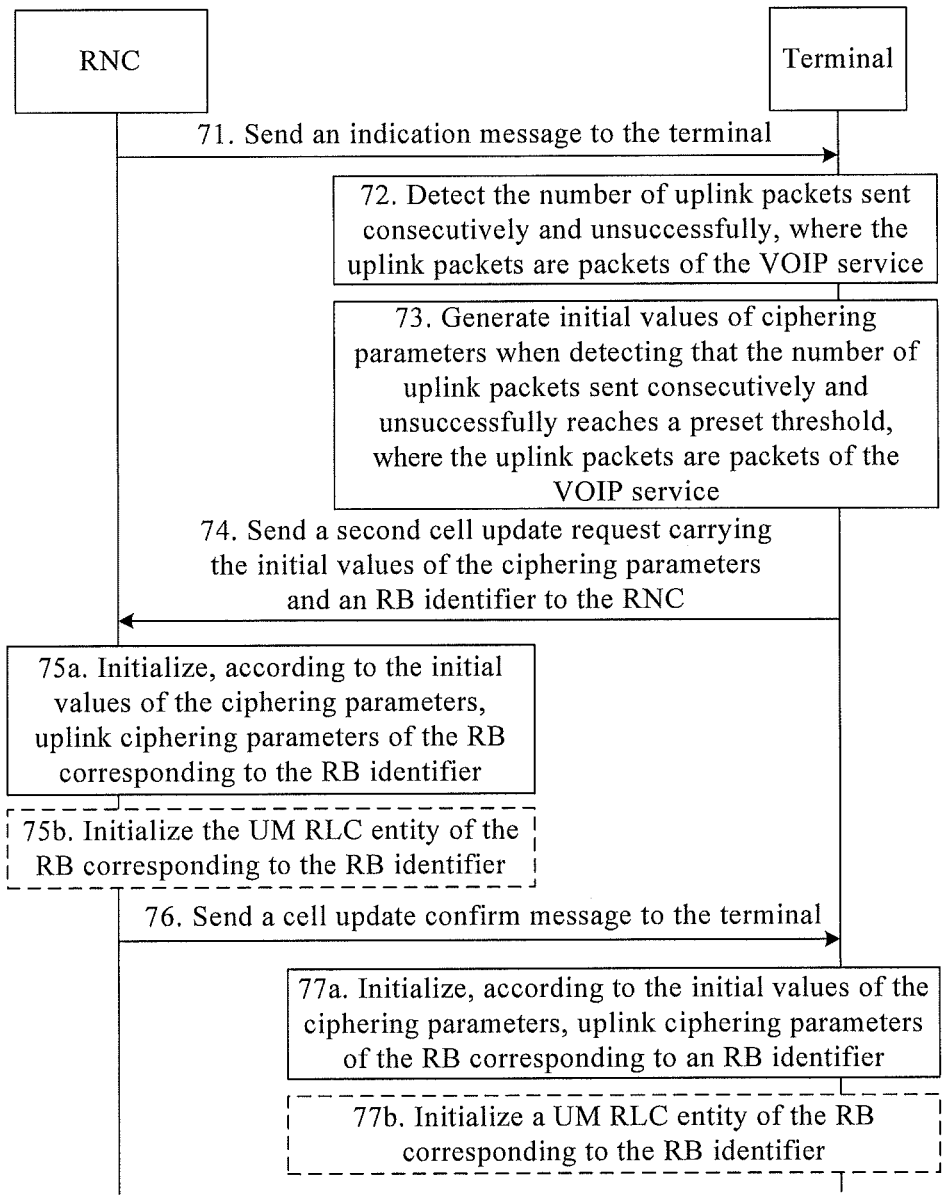
FIG. 7 is a flowchart of another method for synchronizing an uplink ciphering parameter in unacknowledged mode according an embodiment 2 of to the present invention.

FIG. 7 is a flowchart of Embodiment 2 of another method for synchronizing an uplink ciphering parameter in unacknowledged mode according to the present invention. As shown in FIG. 7, this embodiment includes:

Step 71: The RNC sends a detection indication message to the terminal.

The detection indication message is used to instruct the terminal to detect the number of uplink packets sent consecutively and unsuccessfully, and carries an RB identifier corresponding to an RB bearing a designated service. The designated service determined by the RNC in this embodiment is a VoIP service.

Step 72: The terminal detects the number of uplink packets sent consecutively and unsuccessfully, where the uplink packets are packets of the VoIP service.

The terminal detects, according to the detection indication message of the RNC, the number of uplink packets sent to the RNC consecutively and unsuccessfully in UM mode, where the uplink packets are packets of the VoIP service.

The terminal detects the sending of uplink packets through a HARQ (Hybrid Automatic Repeat Request, hybrid automatic repeat request) entity of a MAC layer. The specific method may be as follows: An RRC layer of the terminal starts the HARQ entity of the MAC layer through an RRC-MAC-Req primitive, instructs the HARQ entity to consecutively detect whether sending of UM RB uplink packets fails, and counts the number of uplink packets sent consecutively and unsuccessfully. When the MAC layer requests the RLC layer for a higher-layer PDU through a MAC-RLC-Req (MAC-DATA-Req) primitive, the MAC layer also requests the RLC to deliver the identifier of the RB where each uplink packet is located, and counts the number of uplink packets sent unsuccessfully, where the uplink packets are packets of a UM RB bearing the agreed service. The specific counting method is as follows: When the ACK of the uplink packet is not received from the peer after the HARQ is retransmitted for several times or after the discard timer expires, a MAC entity is instructed to determine whether the uplink packet belongs to a UM RB bearing the agreed service (or the service to be detected which is determined by the terminal); and if so, the counter increases by 1, and the subsequent uplink packets are also detected in the same way. If the HARQ entity receives the ACK of the uplink packet sent over the RB before the value of the counter reaches the specified preset threshold, the counter is cleared to 0. If the number of uplink packets sent unsuccessfully reaches the preset threshold before the value of the counter reaches the specified preset threshold, it indicates that too many uplink packets are lost, which may cause desynchronization of an uplink ciphering parameter.

Step 73: The terminal generates an initial value of a ciphering parameter when detecting that the number of uplink packets sent consecutively and unsuccessfully reaches the preset threshold, where the uplink packets are packets of the VoIP service.

Specifically, when the MAC layer of the terminal detects that the number (the value of the counter) of unsuccessfully sent uplink packets of the VoIP service reaches the preset threshold indicated by the RRC, the MAC layer reports to the RRC layer, through a MAC-RRC primitive, that the number of unsuccessfully sent uplink packets reaches the preset threshold. After the RRC layer receives the report of the MAC layer, where the report indicates that the number of unsuccessfully sent uplink packets reaches the preset threshold, the terminal generates an initial value of the ciphering parameter, for example, the terminal generates a Start value used for initializing the HFN in the ciphering key sequence number, and then initiates a cell update process to the RNC.

Step 74: The terminal sends a second cell update request carrying the initial value of the ciphering parameter and an RB identifier to the RNC.

The second cell update request is used to instruct the RNC to initialize, according to the carried an initial value of the ciphering parameter, a UM RLC entity of an RB corresponding to the RB identifier. Further, the second cell update request may instruct the RNC to initialize the UM RLC entity of the RB corresponding to the RB identifier.

Step 75a: The RNC initializes, according to the initial value of the ciphering parameter, an uplink ciphering parameter of the RB corresponding to the RB identifier.

Specifically, the RNC initializes the HFN according to the start value in the cell update request, and optionally initializes the SN to 0. Further, if the second cell update request instructs the RNC to initialize the UM RLC entity of the RB corresponding to the RB identifier, after step 75a, step 75b is further included: Initialize the UM RLC entity of the RB corresponding to the RB identifier.

Step 76: The RNC sends a cell update confirm message to the terminal.

Step 77a: The terminal initializes, according to the initial value of the ciphering parameter, an uplink ciphering parameter of the RB corresponding to the RB identifier.

The terminal performs the same initialization operation as the RNC after receiving the cell update confirm message. Specifically, the terminal initializes the HFN according to the start value, and optionally initializes the SN to 0. Further, if the second cell update request instructs the RNC to initialize the UM RLC entity of the RB corresponding to the RB identifier, after step 77a, step 77b is further included: The terminal initializes the UM RLC entity of the RB corresponding to the RB identifier.

In the embodiment of the present invention, the terminal detects the number of unsuccessfully sent uplink packets according to the indication of the RNC. The terminal initiates a cell update process when detecting that the number of unsuccessfully sent uplink packets reaches the preset threshold. Synchronization of an uplink ciphering parameter between the RNC and the terminal is implemented in the cell update process.

Figure 8A:
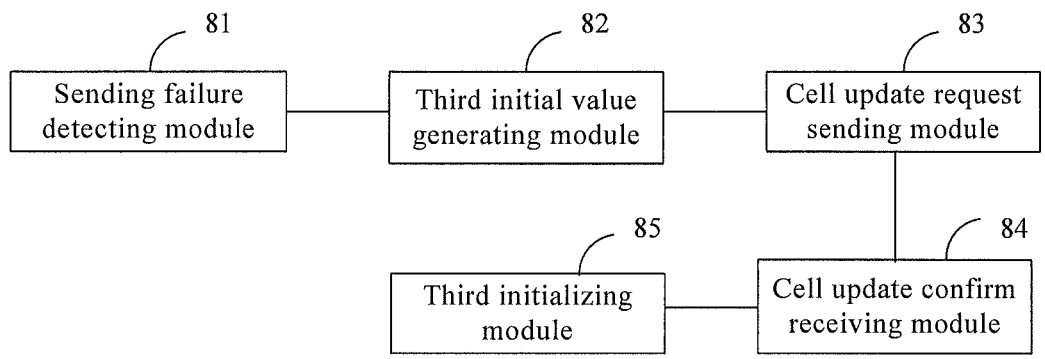
FIG. 8A is a schematic structural diagram of another terminal according to an embodiment 1 of the present invention.

FIG. 8A is a schematic structural diagram of Embodiment 1 of another terminal according to the present invention. As shown in FIG. 8A, this embodiment includes: a sending failure detecting module 81, a third initial value generating module 82, a cell update request sending module 83, a cell update confirm receiving module 84, and a third initializing module 85.

The sending failure detecting module 81 is configured to detect the number of uplink packets sent consecutively and unsuccessfully in unacknowledged mode to a radio network controller.

Specifically, the sending failure detecting module 81 is configured to detect the number of uplink packets sent consecutively and unsuccessfully to the radio network controller in unacknowledged mode, where the uplink packets are packets of a service agreed with the terminal.

The third initial value generating module 82 is configured to generate an initial value of a ciphering parameter when it is detected that the number of unsuccessfully sent uplink packets reaches a preset threshold.

The cell update request sending module 83 is configured to send a cell update request carrying the initial value of the ciphering parameter to the radio network controller.

Specifically, the cell update request sending module is configured to send a first cell update request carrying the initial value of the ciphering parameter to the radio network controller, where the first cell update request is used to instruct the radio network controller to initialize, according to the carried an initial value of the ciphering parameter, an uplink ciphering parameter of a radio bearer bearing the agreed service.

The cell update confirm receiving module 84 is configured to receive a cell update confirm message sent by the radio network controller.

The third initializing module 85 is configured to initialize an uplink ciphering parameter according to the initial value of the ciphering parameter after the cell update confirm message sent by the radio network controller is received.

Specifically, the third initializing module 85 is configured to initialize, according to the initial value of the ciphering parameter, the uplink ciphering parameter of the radio bearer bearing the agreed service.

Further, the third initializing module 85 is specifically configured to initialize a radio link control entity of the radio bearer bearing the agreed service; and the first cell update request is further used for the terminal to initialize the radio link control entity of the radio bearer bearing the agreed service.

The terminal in this embodiment may be a terminal in the method embodiment corresponding to FIG. 6, and for the operating principle of each of the above modules, reference may be made to the description in the method embodiment corresponding to FIG. 6, which is not described here again.

In this embodiment, the terminal detects failure of uplink packet sending, and the terminal initiates a cell update process when the terminal detects that uplink packet sending fails. Synchronization of an uplink ciphering parameter between the RNC and the terminal is implemented in the cell update process. In the embodiment of the present invention, during synchronization of an uplink ciphering parameter, the communication link between the terminal and the radio network controller is not broken. Therefore, the service between the terminal and the radio network controller is not interrupted, and the speed of synchronizing the uplink ciphering parameter is increased.

Figure 8B:
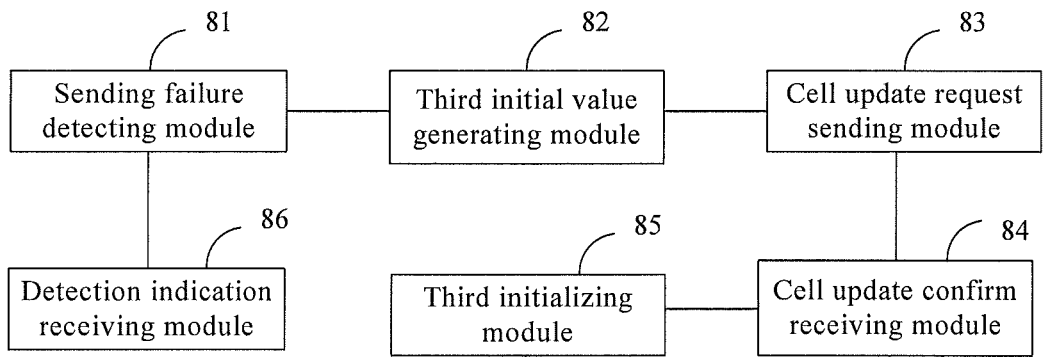
FIG. 8B is a schematic structural diagram of another terminal according to an embodiment 2 of the present invention.

FIG. 8B is a schematic structural diagram of Embodiment 2 of another terminal according to the present invention. As shown in FIG. 8B, this embodiment further includes a detection indication receiving module 86.

The detection indication receiving module 86 is configured to receive a detection indication message sent by the radio network controller, where the detection indication message is used to instruct the terminal to detect the number of uplink packets sent consecutively and unsuccessfully, where the uplink packets are packets of a designated service, and the detection indication message carries an RB identifier corresponding to an RB bearing the designated service.

The sending failure detecting module 81 is specifically configured to detect the number of uplink packets sent consecutively and unsuccessfully to the radio network controller in unacknowledged mode over the radio bearer corresponding to the radio bearer identifier.

The cell update request sending module 83 is specifically configured to send a second cell update request carrying the initial value of the ciphering parameter to the radio network controller, where the second cell update request is used to instruct the radio network controller to initialize, according to the initial value of the ciphering parameter, an uplink ciphering parameter of the radio bearer corresponding to the radio bearer identifier.

The third initializing module 85 is specifically configured to initialize, according to the initial value of the ciphering parameter, the uplink ciphering parameter of the radio bearer corresponding to the radio bearer identifier.

Further, the third initializing module 85 is configured to initialize a radio link control entity of the radio bearer corresponding to the radio bearer identifier; and the second cell update request is further used to instruct the radio network controller to initialize the radio link control entity of the radio bearer corresponding to the radio bearer identifier.

The terminal in this embodiment may be a terminal in the method embodiment corresponding to FIG. 7, and for the operating principle of each of the above modules, reference may be made to the description in the method embodiment corresponding to FIG. 7, which is not described here again.

In this embodiment, the RNC instructs the terminal to detect the sending of the uplink packet of the designated service. The detection indication message sent by the RNC carries the RB identifier corresponding to the RB bearing the designated service. The terminal detects the number of consecutively sent uplink packets bearing the designated service after receiving the detection indication message.

Figure 9A:
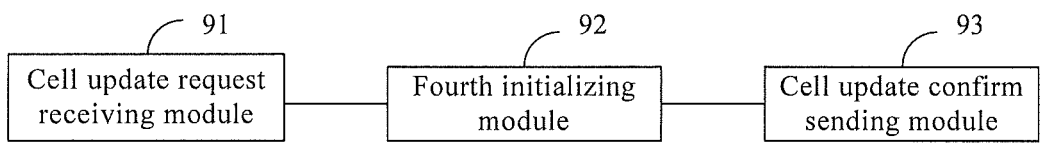
FIG. 9A is a schematic structural diagram of another radio network controller according to an embodiment 1 of the present invention.

FIG. 9A is a schematic structural diagram of Embodiment 1 of another radio network controller according to the present invention. As shown in FIG. 9A, this embodiment includes: a cell update request receiving module 91, a fourth initializing module 92, and a cell update confirm sending module 93.

The cell update request receiving module 91 is configured to receive a cell update request which is sent by a terminal and carries an initial value of a ciphering parameter, where the cell update request is used to instruct the radio network controller to initialize an uplink ciphering parameter according to the initial value of the ciphering parameter.

Specifically, the cell update request receiving module is configured to receive a first cell update request which is sent by the terminal and carries the initial value of the ciphering parameter, where the first cell update request is used to instruct the radio network controller to initialize, according to the carried an initial value of the ciphering parameter, an uplink ciphering parameter of a radio bearer bearing an agreed service.

The fourth initializing module 92 is configured to initialize the uplink ciphering parameter according to the initial value of the ciphering parameter in the cell update request.

Specifically, the fourth initializing module 92 is configured to initialize, according to the initial value of the ciphering parameter, the uplink ciphering parameter of the radio bearer bearing the agreed service.

The cell update confirm sending module 93 is configured to send a cell update confirm message to the terminal.

Further, the fourth initializing module 92 is specifically configured to initialize a radio link control entity of the radio bearer bearing the agreed service; and the first cell update request is further used for the terminal to initialize the radio link control entity of the radio bearer bearing the agreed service.

The RNC in this embodiment may be an RNC in the method embodiment corresponding to FIG. 6, and for the operating principle of each of the above modules, reference may be made to the description in the method embodiment corresponding to FIG. 6, which is not described here again.

In this embodiment, after the RNC receives the cell update request sent by the terminal, the RNC initializes the uplink ciphering parameter according to the carried an initial value of the ciphering parameter, and further initializes the UM RLC entity according to the indication of the terminal.

Figure 9B:
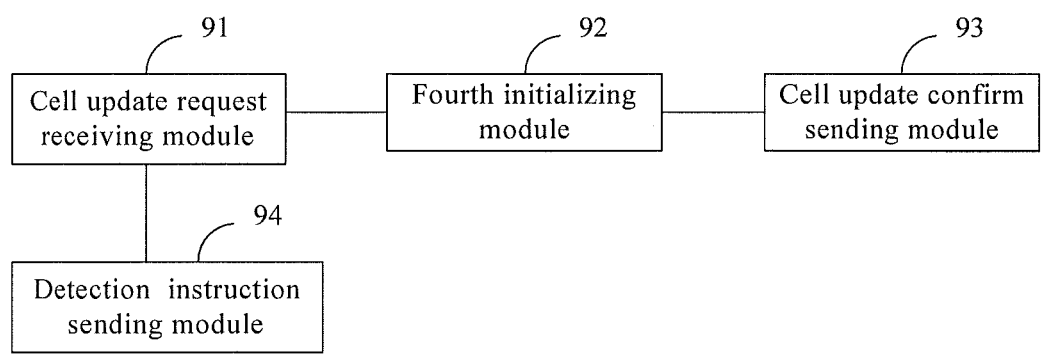
FIG. 9B is a schematic structural diagram of another radio network controller according to an embodiment 2 of the present invention.

FIG. 9B is a schematic structural diagram of Embodiment 2 of another radio network controller according to the present invention. As shown in FIG. 9B, this embodiment further includes a detection instruction sending module 94.

The detection instruction sending module 94 is configured to send a detection indication message to the terminal, where the detection indication message is used to instruct the terminal to detect the number of uplink packets sent consecutively and unsuccessfully, where the uplink packets are packets of a designated service, and the detection indication message carries an RB identifier corresponding to an RB bearing the designated service.

The cell update request receiving module 91 is specifically configured to receive a second cell update request which is sent by the terminal and carries the initial value of the ciphering parameter, where the second cell update request is used to instruct the radio network controller to initialize, according to the initial value of the ciphering parameter, an uplink ciphering parameter of the radio bearer corresponding to the radio bearer identifier.

The fourth initializing module 92 is specifically configured to initialize, according to the initial value of the ciphering parameter, the uplink ciphering parameter of the radio bearer corresponding to the radio bearer identifier.

Further, the fourth initializing module 92 is specifically configured to initialize a radio link control entity of the radio bearer corresponding to the radio bearer identifier; and the second cell update request is further used to instruct the radio network controller to initialize the radio link control entity of the radio bearer corresponding to the radio bearer identifier.

The RNC in this embodiment may be an RNC in the method embodiment corresponding to FIG. 7, and for the operating principle of each of the above modules, reference may be made to the description in the method embodiment corresponding to FIG. 7, which is not described here again.

In this embodiment, the RNC instructs the terminal to detect the sending of the uplink packet of the designated service. The terminal initiates a cell update request when detecting that the number of uplink packets sent consecutively and unsuccessfully reaches the preset threshold. The RNC initializes the uplink ciphering parameter according to the carried an initial value of the ciphering parameter after receiving the cell update request sent by the terminal, and further initializes the UM RLC entity according to the indication of the terminal.

Persons of ordinary skill in the art may understand that all or part of the steps in the method according to the embodiments may be implemented by a program instructing hardware. The program may be stored in a computer readable storage medium and when the program runs, the steps in the method according to the embodiments are executed. The storage medium is any medium that can store program codes, such as a ROM, a RAM, a magnetic disk, or a CD-ROM.

Finally, it should be noted that the above embodiments of the present invention are merely used for describing the technical solutions of the present invention rather than limiting the present invention. Although the present invention is described in detail with reference to the foregoing embodiments, persons of ordinary skill in the art should understand that they can still make modifications to the technical solutions described in the foregoing embodiments or make equivalent replacements to some technical features thereof, as long as such modifications or replacements do not cause the essence of the corresponding technical solutions to depart from the scope of the technical solutions of the embodiments of the present invention.

What is claimed is:

1. A method for synchronizing an uplink ciphering parameter in unacknowledged mode by a radio network controller, comprising:
    sending an indication message carrying a radio bearer identifier corresponding to a radio bearer to a terminal when in unacknowledged mode, the radio network controller detects that an unrecoverable error occurs in an uplink packet or that an uplink packet is invalid, wherein the uplink packet is bore by the radio bearer corresponding to the radio bearer identifier and is a packet of a designated service, and the indication message is used to instruct the terminal to generate an initial value of a ciphering parameter and initialize an uplink ciphering parameter of the radio bearer corresponding to the radio bearer identifier according to the initial value of the ciphering parameter;
    receiving a response message carrying the initial value of the ciphering parameter generated according to the indication message, the response message being sent by the terminal; and
    initializing, according to the initial value of the ciphering parameter in the response message, the uplink ciphering parameter of the radio bearer corresponding to the radio bearer identifier,
    wherein the uplink ciphering parameter is synchronized with the terminal while a communication link between the terminal and the radio network controller remains uninterrupted.

2. The method for synchronizing the uplink ciphering parameter in unacknowledged mode according to claim 1, wherein the initial value is generated by the terminal according to the indication message sent to the terminal by the radio network controller;
    the response message which is sent by the terminal includes the initial value of the ciphering parameter; and
    the initializing of the uplink ciphering parameter of the radio bearer by the radio network controller is implemented according to the initial value of the ciphering parameter in the response message.

3. The method for synchronizing the uplink ciphering parameter in unacknowledged mode according to claim 1, wherein the uplink packet is a packet of an agreed service agreed by the radio network controller and the terminal;
    wherein the indication message is used to instruct the terminal to generate the initial value of the ciphering parameter and initialize, according to the initial value of the ciphering parameter, the uplink ciphering parameter of the radio bearer bearing the agreed service; and
    initializing, by the radio network controller, according to the initial value of the ciphering parameter in the response message, the uplink ciphering parameter of the radio bearer bearing the agreed service.

4. The method for synchronizing the uplink ciphering parameter in unacknowledged mode according to claim 3, wherein the indication message is further used to instruct the terminal to initialize a radio link control entity of the radio bearer bearing the agreed service, after the uplink ciphering parameter of the radio bearer bearing the agreed service are initialized according to the initial value of the ciphering parameter; and
    after the initializing, by the radio network controller, the uplink ciphering parameter of the radio bearer bearing the agreed service according to the initial value of the ciphering parameter in the response message, the method further comprises: initializing, by the radio network controller, the radio link control entity of the radio bearer bearing the agreed service.

5. The method for synchronizing the uplink ciphering parameter in unacknowledged mode according to claim 1, wherein the indication message is further used to instruct the terminal to initialize a radio link control entity of the radio bearer corresponding to the radio bearer identifier; and
    after the initializing, by the radio network controller, according to the initial value of the ciphering parameter in the response message, the uplink ciphering parameter of the radio bearer corresponding to the radio bearer identifier, the method further comprises initializing, by the radio network controller, the radio link control entity of the radio bearer corresponding to the radio bearer identifier.

6. The method for synchronizing the uplink ciphering parameter in unacknowledged mode according to claim 1, wherein the initializing of the uplink ciphering parameter initializes an uplink ciphering key sequence number corresponding to the radio bearer.

7. A method for synchronizing an uplink ciphering parameter in unacknowledged mode, comprising:
    receiving, by a terminal, a detection indication message sent by a radio network controller, wherein the detection indication message is used to instruct the terminal to detect a number of uplink packet sent consecutively and unsuccessfully in unacknowledged mode to the radio network controller on a radio bearer, wherein the uplink packet is a packet of a designated service and the radio bearer bears the designated service, and the detection indication message carries a radio bearer identifier corresponding to the radio bearer bearing the designated service;
    detecting, by the terminal, the number of the uplink packet sent consecutively and unsuccessfully to the radio network controller in the unacknowledged mode over the radio bearer corresponding to the radio bearer identifier;
    generating, by the terminal, an initial value of a ciphering parameter when detecting that the number of the uplink packet sent consecutively and unsuccessfully on the radio bearer reaches a preset threshold;
    sending, by the terminal, a cell update request carrying the initial value of the ciphering parameter and the radio bearer identifier corresponding to the radio bearer bearing the designated service to the radio network controller, wherein the cell update request is used to instruct the radio network controller to initialize, according to the initial value of the ciphering parameter and the radio bearer identifier corresponding to the radio bearer bearing the designated service, an uplink ciphering parameter of the radio bearer corresponding to the radio bearer identifier;
    receiving, by the terminal, a cell update confirm message sent from the radio network controller; and
    initializing, by the terminal, according to the initial value of the ciphering parameter and the radio bearer identifier corresponding to the radio bearer bearing the designated service, the uplink ciphering parameter of the radio bearer corresponding to the radio bearer identifier.

8. The method for synchronizing the uplink ciphering parameter in unacknowledged mode according to claim 7, wherein the uplink packet is a packet of an agreed service agreed by the radio network controller and the terminal, and the method further comprises:
    sending, by the terminal, the cell update request carrying the initial value of the ciphering parameter to the radio network controller, wherein the cell update request is used to instruct the radio network controller to initialize, according to the initial value of the ciphering parameter, the uplink ciphering parameter of the radio bearer bearing the agreed service; and
    initializing, by the terminal, according to the initial value of the ciphering parameter, the uplink ciphering parameter of the radio bearer bearing the agreed service.

9. The method for synchronizing the uplink ciphering parameter in unacknowledged mode according to claim 8, wherein the cell update request is further used to instruct the radio network controller to initialize a radio link control entity of the radio bearer bearing the agreed service; and
    after the initializing, by the terminal, according to the initial value of the ciphering parameter, the uplink ciphering parameter of the radio bearer bearing the agreed service, the method further comprises: initializing, by the terminal, the radio link control entity of the radio bearer bearing the agreed service.

10. The method for synchronizing the uplink ciphering parameter in unacknowledged mode according to claim 7, wherein the cell update request is further used to instruct the radio network controller to initialize a radio link control entity of the radio bearer corresponding to the radio bearer identifier; and
    after the initializing, by the terminal, according to the initial value of the ciphering parameter and the radio bearer identifier corresponding to the radio bearer bearing the designated service, the uplink ciphering parameter of the radio bearer corresponding to the radio bearer identifier, the method further comprises: initializing, by the terminal, the radio link control entity of the radio bearer corresponding to the radio bearer identifier.

11. A terminal, comprising:
    a receiver, configured to receive a detection indication message sent by a radio network controller, wherein the uplink packet is a packet of a designated service, and the detection indication message carries a radio bearer identifier corresponding to a radio bearer bearing the designated service;
    a processor, configured to detect a number of uplink packet sent consecutively and unsuccessfully to the radio network controller in unacknowledged mode over the radio bearer corresponding to the radio bearer identifier, an initial value of a ciphering parameter being generated when detecting that the number of the uplink packet sent consecutively and unsuccessfully on the radio bearer reaches a preset threshold;
    a transmitter, configured to send a cell update request carrying the initial value of the ciphering parameter and the radio bearer identifier corresponding to the radio bearer bearing the designated service to the radio network controller, wherein the cell update request is used to instruct the radio network controller to initialize, according to the initial value of the ciphering parameter and the radio bearer identifier corresponding to the radio bearer bearing the designated service, an uplink ciphering parameter of the radio bearer corresponding to the radio bearer identifier;
    wherein the receiver is further configured to receive a cell update confirm message sent from the radio network controller; and
    the processor is further configured to initialize, according to the initial value of the ciphering parameter and the radio bearer identifier corresponding to the radio bearer bearing the designated service, the uplink ciphering parameter of the radio bearer corresponding to the radio bearer identifier.

12. The terminal according to claim 11, wherein the processor is further configured to initialize a radio link control entity of the radio bearer corresponding to the radio bearer identifier; and the cell update request is further used to instruct the radio network controller to initialize the radio link control entity of the radio bearer corresponding to the radio bearer identifier.

13. The terminal according to claim 11,
wherein the uplink packet is a packet of an agreed service agreed by the radio network controller and the terminal;
the transmitter is further configured to send the cell update request carrying the initial value of the ciphering parameter to the radio network controller, wherein the cell update request is used to instruct the radio network controller to initialize, according to the initial value of the ciphering parameter, the uplink ciphering parameter of the radio bearer bearing the agreed service; and
the processor is further configured to initialize, according to the initial value of the ciphering parameter, the uplink ciphering parameter of the radio bearer bearing the agreed service.

14. The terminal according to claim 13, wherein the processor is further configured to initialize a radio link control entity of the radio bearer bearing the agreed service; and the cell update request is further used for the radio network controller to initialize the radio link control entity of the radio bearer bearing the agreed service.

15. A radio network controller, comprising:
a transmitter, configured to send a detection indication message to a terminal, wherein the detection indication message is used to instruct the terminal to detect a number of uplink packet sent consecutively and unsuccessfully in unacknowledged mode on a radio bearer that reaches a preset threshold and to generate an initial value of a ciphering parameter, wherein the uplink packet is a packet of a designated service, and the detection indication message carries a radio bearer identifier corresponding to the radio bearer bearing the designated service;
a receiver, configured to receive a cell update request which is sent by the terminal when the terminal detects the number of the uplink packet sent consecutively and unsuccessfully in the unacknowledged mode on the radio bearer reaches the preset threshold and generates the initial value of the ciphering parameter, wherein the cell update request carries the initial value of the ciphering parameter; and
a processor, configured to initialize, according to the initial value of the ciphering parameter and the radio bearer identifier corresponding to the radio bearer, the uplink ciphering parameter of the radio bearer corresponding to the radio bearer identifier;
wherein the transmitter is further configured to send a cell update confirm message to the terminal for initializing the uplink ciphering parameter of the radio bearer corresponding to the radio bearer identifier according to the initial value of the ciphering parameter and the radio bearer identifier corresponding to the radio bearer.

16. The radio network controller according to claim 15, wherein the processor is further configured to initialize a radio link control entity of the radio bearer corresponding to the radio bearer identifier; and the cell update request is further used to instruct the terminal to initialize the radio link control entity of the radio bearer corresponding to the radio bearer identifier.

17. The radio network controller according to claim 15, wherein
the receiver is further configured to receive the cell update request which is sent by the terminal when the terminal detects the number of the uplink packet sent consecutively and unsuccessfully in the unacknowledged mode on the radio bearer reaches the preset threshold and generates the initial value of the ciphering parameter, and the cell update request carries the initial value of the ciphering parameter, wherein the uplink packet is a packet of an agreed service agreed by the radio network controller and the terminal; and
the processor is further configured to initialize, according to the initial value of the ciphering parameter, the uplink ciphering parameter of the radio bearer bearing the agreed service; and
the transmitter is further configured to send the cell update confirm message to the terminal for initializing the uplink ciphering parameter of the radio bearer bearing the agreed service according to the initial value of the ciphering parameter.

18. The radio network controller according to claim 17, wherein the processor is further configured to initialize a radio link control entity of the radio bearer bearing the agreed service; and the cell update request is further used to instruct the terminal to initialize the radio link control entity of the radio bearer bearing the agreed service.

19. A terminal, comprising:
a receiver, configured to receive an indication message carrying a radio bearer identifier corresponding to a radio bearer sent by a radio network controller when in unacknowledged mode, the radio network controller detects that an unrecoverable error occurs in an uplink packet or that an uplink packet is invalid, wherein the uplink packet is bore by the radio bearer corresponding to the radio bearer identifier and is a packet of a designated service;
a processor, configured to generate an initial value of a ciphering parameter and initialize an uplink ciphering parameter of the radio bearer corresponding to the radio bearer identifier according to the indication message and the initial value of the ciphering parameter; and
a transmitter, configured to send a response message comprising the initial value of the ciphering parameter to the radio network controller for initializing the uplink ciphering parameter of the radio bearer corresponding to the radio bearer identifier according to the radio bearer identifier and the initial value of the ciphering parameter,
wherein the uplink ciphering parameter is synchronized with the radio network controller while a communication link between the terminal and the radio network controller remains uninterrupted.

20. The terminal according to claim 19, wherein
the processor is further configured to generate the initial value of the ciphering parameter according to the indication message and initialize the uplink ciphering parameter of the radio bearer according to the indication message and the initial value of the ciphering parameter;
the transmitter is further configured to send a response message comprising the initial value of the ciphering parameter to the radio network controller for initializing the uplink ciphering parameter of the radio bearer according to the initial value of the ciphering parameter.

21. The terminal according to claim 19, wherein the uplink packet is a packet of an agreed service agreed by the radio network controller and the terminal and the radio bearer bears the agreed service,
the processor is further configured to generate the initial value of the ciphering parameter according to the indication message and initialize, according to the indication message and the initial value of the ciphering parameter, the uplink ciphering parameter of the radio bearer bearing the agreed service; and the transmitter is further configured to send the response message comprising the initial value of the ciphering parameter to the radio network controller for initializing the uplink ciphering parameter of the radio bearer bearing the agreed service according to the initial value of the ciphering parameter.

22. The terminal according to claim 21, wherein,
the processor is further configured to initialize a radio link control entity of the radio bearer bearing the agreed service; and the indication message is further used to instruct the radio network controller to initialize the radio link control entity of the radio bearer bearing the agreed service.

23. The terminal according to claim 19, wherein, the receiver is further configured to receive an initialization indication message carrying the initial value of the ciphering parameter generated by the radio network controller from the radio network controller; and
the processor is further configured to initialize the uplink ciphering parameter of the radio bearer according to the initial value of the ciphering parameter carried in the initialization indication message.

24. The terminal according to claim 23, wherein the uplink packet is a packet of an agreed service agreed by the radio network controller and the terminal and the radio bearer bears the agreed service,
the processor is further configured to initialize, according to the initial value of the ciphering parameter in the indication message, the uplink ciphering parameter of the radio bearer bearing the agreed service.

25. The terminal according to claim 24, wherein,
the processor is further configured to initialize a radio link control entity of the radio bearer bearing the agreed service, and
the indication message is further used to instruct the radio network controller to initialize the radio link control entity of the radio bearer bearing the agreed service.

26. The terminal according to claim 23, wherein the uplink packet is a packet of a designated service and the radio bearer bears the designated service,
the receiver is further configured to receive a second initialization indication message carrying the initial value of the ciphering parameter and a radio bearer identifier corresponding to the radio bearer sent by the radio network controller, and
the processor is further configured to initialize, according to the initial value of the ciphering parameter and the radio bearer identifier corresponding to the radio bearer, the uplink ciphering parameter of the radio bearer corresponding to the radio bearer identifier.

27. The terminal according to claim 26, wherein,
the processor is further configured to initialize a radio link control entity of the radio bearer corresponding to the radio bearer identifier; and
the radio network controller initializes the radio link control entity of the radio bearer corresponding to the radio bearer identifier.

28. The terminal according to claim 19 wherein
the processor is further configured to initialize a radio link control entity of the radio bearer corresponding to the radio bearer identifier; and the indication message is further used to instruct the radio network controller to initialize the radio link control entity of the radio bearer corresponding to the radio bearer identifier.

29. A radio network controller, comprising:
a processor, configured to, in unacknowledged mode, detect whether an unrecoverable error occurs in an uplink packet sent by a terminal or whether an uplink packet sent by a terminal is invalid;
a transmitter, configured to send an indication message carrying a radio bearer identifier corresponding to a radio bearer to the terminal when detecting that the unrecoverable error occurs in the uplink packet or that the uplink packet is invalid, wherein the uplink packet is bore by the radio bearer, and the indication message is used to instruct the terminal to initialize an uplink ciphering parameter of the radio bearer according to an initial value of a ciphering parameter; and
a receiver, configured to receive a response message carrying the initial value of the ciphering parameter generated according to the indication message, the response message being sent by the terminal; and
a processor, configured to initialize, according to the initial value of the ciphering parameter in the response message after the response message sent by the terminal is received, the uplink ciphering parameter of the radio bearer corresponding to the radio bearer identifier,
wherein the uplink ciphering parameter is synchronized with the terminal while a communication link between the terminal and the radio network controller remains uninterrupted.

30. The radio network controller according to claim 29, wherein:
the initial value of the ciphering parameter is generated by the terminal according to the indication message,
the receiver is further configured to receive the response message which comprises the initial value of the ciphering parameter which is generated and is sent by the terminal;
the processor is further configured to initialize the uplink ciphering parameter of the radio bearer according to the initial value of the ciphering parameter in the response message.

31. The radio network controller according to claim 29, wherein:
the processor is further configured to detect, in the unacknowledged mode, whether the unrecoverable error occurs in the uplink packet sent by the terminal or whether the uplink packet is invalid, wherein the uplink packet is a packet of an agreed service agreed by the radio network controller and the terminal;
the transmitter is further configured to send the indication message to the terminal when the processor detects that the unrecoverable error occurs in the uplink packet or that the uplink packet is invalid, wherein the indication message is used to instruct the terminal to generate the initial value of the ciphering parameter and initialize, according to the initial value of the ciphering parameter, the uplink ciphering parameter of the radio bearer bearing the agreed service;
the receiver is further configured to receive the response message which carries the initial value of the ciphering parameter generated by the terminal; and
the processor is further configured to initialize, according to the initial value of the ciphering parameter in the response message after the response message sent by the terminal, the uplink ciphering parameter of the radio bearer bearing the agreed service.

32. The radio network controller according to claim 31, wherein,
the processor is further configured to initialize a radio link control entity of the radio bearer bearing the agreed service; and the indication message is further used to instruct the terminal to initialize the radio link control entity of the radio bearer bearing the agreed service, after the uplink ciphering parameter of the radio bearer bearing the agreed service are initialized according to the initial value of the ciphering parameter.

33. The radio network controller according to claim 29, wherein,
the processor is further configured to generate the initial value of the ciphering parameter;
the transmitter is further configured to send an initialization indication message carrying the initial value of the ciphering parameter to the terminal, wherein the initialization indication message is used to instruct the terminal to initialize the uplink ciphering parameter of the radio bearer according to the initial value of the ciphering parameter carried in the initialization indication message; and
the processor is further configured to initialize the uplink ciphering parameter of the radio bearer according to the generated initial value of the ciphering parameter.

34. The radio network controller according to claim 33, wherein:
the processor is further configured to detect, in the unacknowledged mode, whether the unrecoverable error occurs in the uplink packet sent by the terminal or whether the uplink packet is invalid, wherein the uplink packet is a packet of an agreed service agreed by the radio network controller and the terminal;
the transmitter is further configured to send a first initialization indication message carrying the initial value of the ciphering parameter to the terminal when the processor detects that the unrecoverable error occurs in the uplink packet or that the uplink packet is invalid, wherein the first initialization indication message is used to instruct the terminal to initialize, according to the initial value of the ciphering parameter carried in the first initialization indication message, the uplink ciphering parameter of the radio bearer bearing the agreed service;
the processor is further configured to initialize, according to the initial value of the ciphering parameter, the uplink ciphering parameter of the radio bearer bearing the agreed service.

35. The radio network controller according to claim 34, wherein,
the processor is further configured to initialize a radio link control entity of the radio bearer bearing the agreed service; and the first initialization indication message is further used to instruct the terminal to initialize the radio link control entity of the radio bearer bearing the agreed service.

36. The radio network controller according to claim 33, wherein,
the processor is further configured to detect, in the unacknowledged mode, whether the unrecoverable error occurs in the uplink packet sent by the terminal or whether the uplink packet is invalid, wherein the uplink packet is a packet of a designated service and the radio bearer bears the designated service;
the transmitter is further configured to send a second initialization indication message carrying a radio bearer identifier corresponding to the radio bearer and the initial value of the ciphering parameter to the terminal, wherein the second initialization indication message is used to instruct the terminal to initialize, according to the initial value of the ciphering parameter and the radio bearer identifier corresponding to the radio bearer, the uplink ciphering parameter of the radio bearer corresponding to the radio bearer identifier; and
the processor is further configured to initialize, according to the generated initial value of the ciphering parameter, the uplink ciphering parameter of the radio bearer corresponding to the radio bearer identifier.

37. The radio network controller according to claim 36, wherein,
the processor is further configured to initialize a radio link control entity of the radio bearer corresponding to the radio bearer identifier; and the second initialization indication message is further used to instruct the terminal to initialize the radio link control entity of the radio bearer corresponding to the radio bearer identifier.

38. The radio network controller according to claim 29, wherein,
the processor is further configured to initialize a radio link control entity of the radio bearer corresponding to the radio bearer identifier; and the indication message is further used to instruct the terminal to initialize the radio link control entity of the radio bearer corresponding to the radio bearer identifier.

39. A method for synchronizing an uplink ciphering parameter in unacknowledged mode, comprising:
receiving, by a terminal, an indication message carrying a radio bearer identifier corresponding to a radio bearer sent by a radio network controller when in unacknowledged mode, the radio network controller detects that an unrecoverable error occurs in an uplink packet or that an uplink packet is invalid, wherein the uplink packet is bore by a radio bearer corresponding to the radio bearer identifier and is a packet of a designated service;
generating, by the terminal, an initial value of the ciphering parameter according to the indication message;
initializing, by the terminal, according to the radio bearer identifier and the initial value of the ciphering parameter, an uplink ciphering parameter of the radio bearer corresponding to the radio bearer identifier; and
sending, by the terminal, a response message comprising the initial value of the ciphering parameter to the radio network controller for initializing the uplink ciphering parameter of the radio bearer corresponding to the radio bearer identifier according to the radio bearer and the initial value of the ciphering parameter,
wherein the uplink ciphering parameter is synchronized with the radio network controller while a communication link between the terminal and the radio network controller remains uninterrupted.

40. The method for synchronizing the uplink ciphering parameter in unacknowledged mode according to claim 39, further comprising:
receiving, by the terminal, the indication message sent by the radio network controller;
generating, by the terminal, the initial value of the ciphering parameter according to the indication message;

initializing, by the terminal, the uplink ciphering parameter of the radio bearer according to the indication message and the generated initial value of the ciphering parameter; and sending, by the terminal, a response message comprising the initial value of the ciphering parameter to the radio network controller for initializing the uplink ciphering parameter of the radio bearer according to the initial value of the ciphering parameter.

41. The method for synchronizing the uplink ciphering parameter in unacknowledged mode according to claim 39, further comprising:

receiving, by the terminal, an initialization indication message carrying the initial value of the ciphering parameter sent by the radio network controller, wherein the initial value of the ciphering parameter is generated by the radio network controller; and initializing, by the terminal, the uplink ciphering parameter of the radio bearer according to the initial value of the ciphering parameter in the initialization indication message.

42. The method according to claim 39, wherein the uplink packet is a packet of an agreed service agreed by the radio network controller and the terminal and the radio bearer bears the agreed service, and the method further comprises:

receiving, by the terminal, the indication message sent by the radio network controller;

generating, by the terminal, the initial value of the ciphering parameter according to the indication message;

initializing, by the terminal, according to the indication message and the initial value of the ciphering parameter, the uplink ciphering parameter of the radio bearer bearing the agreed service; and sending, by the terminal, the response message comprising the initial value of the ciphering parameter to the radio network controller for initializing the uplink ciphering parameter of the radio bearer bearing the agreed service according to the initial value of the ciphering parameter.

43. The method according to claim 42, further comprising:

initializing, by the terminal, a radio link control entity of the radio bearer bearing the agreed service, wherein the indication message is further used to instruct the radio network controller to initialize the radio link control entity of the radio bearer bearing the agreed service.

44. The method according to claim 39, further comprising:

initializing, by the terminal, a radio link control entity of the radio bearer corresponding to the radio bearer identifier;

wherein the indication message is further used to instruct the radio network controller to initialize the radio link control entity of the radio bearer corresponding to the radio bearer identifier.

* * * * *